US012704408B2

(12) United States Patent
Yamada et al.

(10) Patent No.: US 12,704,408 B2
(45) Date of Patent: Aug. 11, 2026

(54) COLORIMETRY DEVICE

(71) Applicant: SEIKO EPSON CORPORATION, Tokyo (JP)

(72) Inventors: Katsumi Yamada, Matsumoto (JP); Takeshi Tokuda, Shiojiri (JP); Shigeaki Isobe, Matsumoto (JP); Ko Terao, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 18/664,887

(22) Filed: May 15, 2024

(65) Prior Publication Data

US 2024/0385038 A1 Nov. 21, 2024

(30) Foreign Application Priority Data

May 18, 2023 (JP) ................................. 2023-082361

(51) Int. Cl.
*G01J 3/06* (2006.01)
*G01J 3/02* (2006.01)

(52) U.S. Cl.
CPC ............... *G01J 3/06* (2013.01); *G01J 3/0202* (2013.01); *G01J 3/0267* (2013.01); *G01J 3/0278* (2013.01); *G01J 2003/062* (2013.01)

(58) Field of Classification Search
CPC .. G01J 2003/062; G01J 3/0202; G01J 3/0267; G01J 3/0278; G01J 3/0291; G01J 3/06; G01J 3/50
See application file for complete search history.

(56) References Cited

U.S. PATENT DOCUMENTS

2012/0236308 A1* 9/2012 Satoh ..................... G01J 3/021 356/402

FOREIGN PATENT DOCUMENTS

| | | | | |
|---|---|---|---|---|
| JP | H08-327455 A | 12/1996 | | |
| JP | 2016-212001 A | 12/2016 | | |
| WO | WO-2016181721 A1 * | 11/2016 | ................ | G01J 3/50 |

* cited by examiner

*Primary Examiner* — Hina F Ayub
(74) *Attorney, Agent, or Firm* — WORKMAN NYDEGGER

(57) ABSTRACT

A colorimetry device includes a support base having a support surface for supporting a measurement target and a carriage unit configured to move in at least one of a first direction, which is a direction along the support surface, and a second direction, which is a direction along the support surface and which intersects the first direction as a moving direction, wherein the carriage unit includes an accommodation section to which a colorimeter, which is configured to measure color of the measurement target, is detachably and attachably accommodated and a first operation section that is a portion to which an external force is applied when the carriage unit is manually moved in the moving direction.

15 Claims, 29 Drawing Sheets

COLORIMETRY DEVICE

The present application is based on, and claims priority from JP Application Serial Number 2023-082361, filed May 18, 2023, the disclosure of which is hereby incorporated by reference herein in its entirety.

BACKGROUND

1. Technical Field

The present disclosure relates to a colorimetry device equipped a carriage unit to which a colorimeter is attachable and detachable.

2. Related Art

JP-A-2016-212001 discloses an automatic colorimetry device including a installation table on which a color chart is installed, and a drive device for scanning a spectrodensitometer, which is an example of a colorimeter, in X-Y and Z directions. The spectrodensitometer is configured to be attachable to and detachable from the installation table.

In the automatic colorimetry device described in JP-A-2016-212001, if a user wants to manually adjust the position of the spectrodensitometer, there is a possibility that the user directly grips the spectrodensitometer and moves it in the direction to be adjusted. However, there is the possibility that when the user directly grips the spectrodensitometer and tries to move the spectrodensitometer in a desired direction, the spectrodensitometer may unintentionally detach from the mounting base, which may cause damage to the spectrodensitometer, the mounting base, and the like.

SUMMARY

The colorimetry device of the present disclosure for solving the above problem includes a support base having a support surface for supporting a measurement target and a carriage unit configured to move in, as a moving direction, at least one of a first direction, which is a direction along the support surface, and a second direction, which is a direction along the support surface and which intersects the first direction, wherein the carriage unit includes an accommodation section in which a colorimeter, which is configured to measure color of the measurement target, is attachably and detachably accommodated and a first operation section, which is a portion to which an external force is applied when the carriage unit is manually moved in the moving direction.

DESCRIPTION OF EMBODIMENTS

Figure 1:
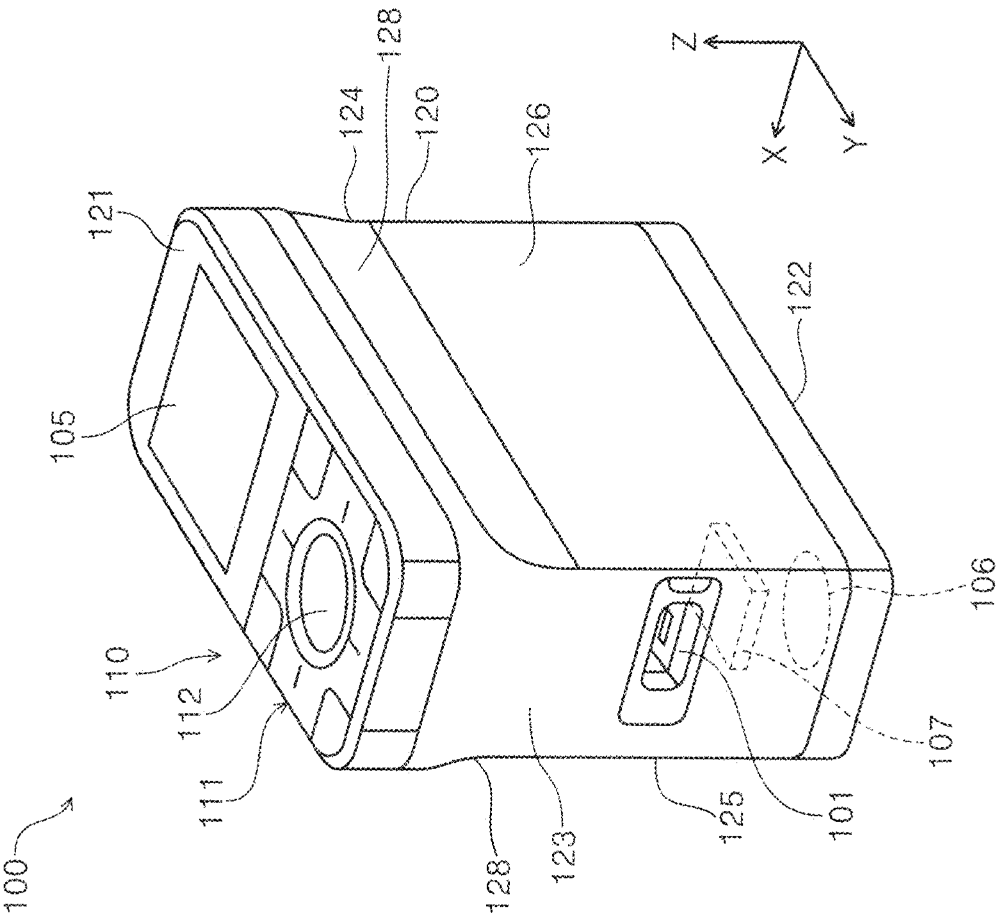
FIG. 1 is a perspective view of a colorimeter.

The present disclosure will be schematically described.

A colorimetry device according to the first aspect includes a support base having a support surface for supporting a measurement target and a carriage unit configured to move in, as a moving direction, at least one of a first direction, which is a direction along the support surface, and a second direction, which is a direction along the support surface and which intersects the first direction, wherein the carriage unit includes an accommodation section in which a colorimeter, which is configured to measure color of the measurement target, is attachably and detachably accommodated and a first operation section, which is a portion to which an external force is applied when the carriage unit is manually moved in the moving direction.

In the present aspect, since the carriage unit includes the first operation section that is the portion to which an external force is applied when the carriage unit is manually moved in the moving direction, it is possible to prevent the colorimeter from being directly gripped when the user tries to manually move the carriage unit in the movement direction. As a result, damage to the colorimeter, the carriage unit, or the like can be suppressed.

A second aspect is an aspect dependent on the first aspect, wherein with the first direction as the moving direction, the carriage unit configured to move in the first direction by power of a first motor and the carriage unit further includes a first guided section guided in the first direction by a first guide section, which extends in the first direction.

According to the present aspect, in the configuration in which the carriage unit is configured to move in the first direction by the power of the first motor with the first direction as the moving direction, the operation and effect of the first aspect described above can be obtained.

A third aspect is an aspect dependent on the second aspect, wherein the first operation section is provided on the first guided section.

Since the carriage unit is guided in the first direction by the first guide section, the carriage unit receives a reaction force from the first guide section when the carriage unit moves in the first direction. Therefore, when the portion of the carriage unit that receives the reaction force from the first guide section is separated from the position of the first operation section, the external force applied to the first operation section is less likely to act along the first direction and a large external force is required when the carriage unit is manually moved in the movement direction.

However, according to the present aspect, since the first operation section is provided in the first guided section which is the portion that receives the reaction force from the first guide section, the portion in which the carriage unit receives the reaction force from the first guide section and the position of the first operation section are close to each other. With this configuration, the external force applied to the first operation section easily acts along the first direction, and the carriage unit can be manually moved with a light operation force.

A fourth aspect is an aspect dependent on the third aspect, further includes a first endless belt that is a belt to which the first guided section is fixed and that is provided along the first direction, a first drive pulley around which the first endless belt is wound, and a first driven pulley that is a pulley provided at a position separated with respect to the first drive pulley in the first direction and that around which the first endless belt is wound, wherein the first operation section and a portion where the first guided section is fixed to the first endless belt overlap each other in the first direction.

Note that the first operation section and the portion where the first guided section is fixed to the first endless belt overlapping in the first direction means that at least a portion of the first operation section and at least a portion of the portion where the first guided section is fixed to the first endless belt are at the same position in the first direction.

Since the first guided section is configured to be pulled in the first direction by the first endless belt, when the first guided section is manually moved in the first direction, the first guided section receives a reaction force from the first endless belt. Therefore, when the position where the first guided section receives the reaction force from the first endless belt, that is, the portion where the first guided section is fixed to the first endless belt is separated from the position of the first operation section, the external force applied to the first operation section is less likely to act along the first direction, and a large external force is required when the carriage unit is manually moved in the movement direction.

However, according to the present aspect, since the first operation section and the portion where the first guided section is fixed to the first endless belt overlap each other in the first direction, the position where the first guided section receives the reaction force from the first endless belt and the first operation section are close to each other. With this configuration, the external force applied to the first operation section easily acts along the first direction, and the carriage unit can be manually moved with a lighter operation force.

A fifth aspect is an aspect dependent on the third aspect, wherein the first guide section includes a first guide surface extending in the first direction, the first guided section includes a pressing slider that presses against and contacts the first guide surface and a pressing member that presses the pressing slider toward the first guide surface, and the carriage unit includes a unit for reducing the force with which the pressing slider presses against the first guide surface.

According to the present aspect, since the first guided section includes the pressing slider that presses and contacts against the first guide surface and the pressing member that presses the pressing slider toward the first guide surface, it is possible to suppress the rattling of the first guided section when the first guided section moves in the first direction.

Here, a force with which the pressing slider is pressed and contacted against the first guide surface becomes a resistance when the external force is applied to the first operation section to move the carriage unit, which leads to a decrease in operability. However, since the carriage unit includes the unit for reducing the force with which the pressing slider is pressed and contacted against the first guide surface, the resistance when the carriage unit is moved by applying the external force to the first operation section is reduced, and the operability can be improved.

Note that the aspect is not limited to the third aspect and may be depended on the fourth aspect.

A sixth aspect is an aspect dependent on the third aspect, further includes a first cover member that covers the first guide section and the first guided section, wherein at least a portion of the first operation section overlaps with the first cover member in plan view of the first operation section, and a brightness of a color of the portion where the first operation section overlaps the first cover member in plan view of the first operation section is different from a brightness of a color of the first cover member.

According to the present aspect, since the brightness of the color of the portion where the first operation section overlaps the first cover member in plan view of the first operation section and is different from the brightness of the color of the first cover member, the presence of the first operation section is visually easily recognized, and usability is improved.

Note that the present aspect is not limited to the third aspect, and may be dependent on the fourth or fifth aspect.

A seventh aspect is an aspect dependent on the first aspect, wherein the first operation section is provided with a first identification mark indicating a moving direction of the carriage unit.

According to the present aspect, since the first operation section is provided with the first identification mark indicating the moving direction of the carriage unit, the moving direction of the carriage unit 30, that is, the operating direction of the first operation section is visually easily recognized, and usability is improved.

Note that the present aspect is not limited to the first aspect and may be dependent on any one of the second to sixth aspects.

An eighth aspect is an aspect dependent on the first aspect, wherein the carriage unit includes the accommodation section that accommodates the colorimeter in a detachable and attachable manner, the accommodation section is provided to be movable by the power of a raising and lowering motor in a third direction, which is a direction in which the accommodation section advances and retreats with respect to the support surface, when the colorimeter is to be mounted in the accommodation section, a control section for controlling the raising and lowering motor positions the accommodation section at a mounting position in the third direction, and when the third direction is along a vertical direction and the accommodation section is at the mounting position, an upper end portion of the first operation section is at a position lower than an upper end portion of the accommodation section.

According to the present aspect, since the upper end portion of the first operation section is at the position lower than the upper end portion of the accommodation section when the accommodation section is at the mounting position, the first operation section is less likely to be an obstacle when the colorimeter is attached to and detached from the accommodation section, and the attachment and detachment work of the colorimeter can be performed more easily.

Note that the present aspect is not limited to the first aspect and may be dependent on any one of the second to seventh aspects.

A ninth aspect is an aspect dependent on the second aspect, wherein the carriage unit is provided on a second direction moving section which is a portion that has a shape extending in the first direction and that is configured to move in the second direction with respect to the support base by the power of a second motor, and the second direction moving section is provided with a second operation section, which is a portion to which an external force is applied when the second direction moving section is manually moved in the second direction.

According to the present aspect, since the carriage unit is provided on the second direction moving section which is the section having the shape extending in the first direction and is configured to move in the second direction with respect to the support base by the power of the second motor, the carriage unit can be moved in the second direction via the second direction moving section. That is, the moving directions of the carriage unit are two directions of the first direction and the second direction.

In such a configuration, since the second direction moving section is provided with the second operation section that is the portion to which the external force is applied when the second direction moving section is manually moved in the second direction, it is possible to prevent the colorimeter from being directly gripped when the user tries to manually move the second direction moving section in the second direction. As a result, damage to the colorimeter, the carriage unit, or the like can be suppressed.

Note that the present aspect is not limited to the first aspect and may be dependent on any one of the third to eighth aspects.

A tenth aspect is an aspect dependent on the ninth aspect, wherein the first direction is along a device depth direction, the second direction moving section includes a first support section extending in a third direction, which intersects the support surface, a second support section that is disposed separated by a gap with respect to the first support section in the first direction and that extends in the third direction, and a beam section that extends in the first direction and that is supported by the first support section and the second support section, the first support section is disposed on a device front side on which a power button of the device is disposed with respect to the second support section, and the second operation section is provided on the first support section.

According to the present aspect, since the first support section is disposed on the device front side on which the power button of the device is disposed with respect to the second support section and the second operation section is provided on the first support section, the second operation section is disposed at a position close to the user. This improves operability when the user manually moves the second direction moving section in the second direction.

A eleventh aspect is an aspect dependent on the tenth aspect, wherein the first support section includes a second guided section that is guided in the second direction by a second guide section, which extends in the second direction and the second operation section includes an intermediate position between a position of the first support section farthest from the second guided section and the second guided section in the third direction.

Since the first support section is guided in the second direction by the second guide section, the first support section receives a reaction force from the second guide section when the first support section moves in the second direction. Therefore, when the portion where the first support section receives the reaction force from the second guide section and the position of the second operation section are separated from each other, the external force applied to the second operation section is less likely to act along the second direction, and a large external force is required when the first support section is manually moved in the second direction.

However, according to the present aspect, since the second operation section includes the intermediate position between the position of the first support section farthest from the second guided section and the second guided section in the third direction, the portion in which the first support section receives the reaction force from the second guide section and the position of the second operation section are close to each other. With this configuration, the external force applied to the second operation section easily acts along the second direction, and the first support section, that is, the second direction moving section can be manually moved with a light operation force.

A twelfth aspect is an aspect dependent on the tenth aspect, wherein the second operation section is constituted by a recess section provided on a side surface of the first support section.

According to the present aspect, since the second operation section is constituted by the recess section provided on the side surface of the first support section, it is possible to configure the second operation section with a simple structure at a low cost. The recess section makes it easy to grip the second operation section.

Note that the present aspect is not limited to the tenth aspect and may be depended on the eleventh aspect.

A thirteenth aspect is an aspect dependent on the twelfth aspect, wherein a second identification mark indicating the moving direction of the second direction moving section is provided on the upper surface of the first support section.

According to the present aspect, since the second identification mark indicating the moving direction of the second direction moving section is provided on the upper surface of the first support section, the moving direction of the second direction moving section, that is, the operating direction of the second operation section is visually easily recognized, and usability is improved.

In particular, in a case where the second operation section is configured by the recess section provided on the side surface of the first support section, it is difficult to visually recognize the second operation section in plan view of the first support section. However, according to the present aspect, since the second identification mark is provided on the upper surface of the first support section, it is possible to easily visually recognize that the second operation section is provided.

The fourteenth aspect is an aspect dependent on the first aspect, wherein the carriage unit includes an alignment frame disposed on a side surface of the accommodation section and the alignment frame has an opening for alignment with respect to the measurement target.

According to the present aspect, the position of the carriage unit with respect to the measurement target can be easily adjusted.

Note that the present aspect is not limited to the first aspect and may be dependent on any one of the second to thirteenth aspects.

Hereinafter, the present disclosure will be specifically described.

An X-Y-Z coordinate system shown in each figure is a rectangular coordinate system, in which an X-Y plane is a horizontal plane, and an X-Z plane and a Y-Z plane are vertical planes.

Note that in the present embodiment, in a state in which a support surface 10*a* of a support base 10 included in a colorimetry device 1 is along a horizontal plane, an X-axis direction and a Y-axis direction are directions along the support surface 10*a*. Hereinafter, when the configuration of a colorimeter 100 and a colorimetry device 1 is described, it is assumed that the support surface 10*a* of the support base 10 is along the horizontal plane. In this case the Y-axis direction is an example of a first direction, the X-axis direction is an example of a second direction, a Z-axis direction is an example of a third direction. The Z-axis direction is a vertical direction, a +Z direction is a vertically upward direction, and a −Z direction is a vertically downward direction. The +Y direction is the rear of the device, and the −Y direction is the front of the device.

Hereinafter, first, the configuration of the colorimeter 100 for measuring color of a colorimetry target will be outlined with reference to FIG. 1.

The colorimeter 100 according to the present embodiment is a hand-type colorimeter that can be held and handled by a user with one hand. The colorimeter 100 is equipped internally with an incident light processing section 107 that processes incident light. Although detailed illustration of the incident light processing section 107 is omitted, the incident light processing section 107 in the present embodiment includes an optical filter (not shown).

This optical filter selectively transmits an arbitrary wavelength component from the light incident on the inside of the device. The light transmitted through the optical filter enters a light receiving element (not shown), specifically, a photodiode. Then the intensity of the incident light is converted into a voltage value and is output to the control section (not shown) of the colorimeter 100. The colorimeter 100 measures the spectrum of the colorimetry target by repeatedly performing wavelength selection by the optical filter and acquisition of the received light intensity. In the present embodiment, the optical filter is a wavelength variable type Fabry-Perot etalon, and is a wavelength filter using multiple interference of two opposing reflection surfaces. Of course, the incident light processing section 107 is not limited to a configuration including such an optical filter. The wavelength variable type Fabry-Perot etalon is configured to select a wavelength by controlling a gap in an optical axis direction between a pair of mirrors (not shown) disposed to face each other with a gap therebetween in the optical axis direction. In the present embodiment, the optical axis direction is the Z-axis direction.

Next, the colorimeter 100 has an upper surface 121 as a surface in the +Z direction and a bottom surface 122 as a surface in the −Z direction. The colorimeter 100 has a right side surface 125 which is a side surface in the +X direction, a left side surface 126 which is a side surface in the −X direction, a rear surface 123 which is a side surface in the +Y direction, and a front surface 124 which is a side surface in the −Y direction. Reference symbol 120 denotes a housing forming an outer shell of the colorimeter 100.

Hereinafter, the right side surface 125, the left side surface 126, the rear surface 123, and the front surface 124 may be referred to as "side surfaces of the colorimeter 100".

An opening section 106 is formed in the bottom surface 122, and incident light from the colorimetry target toward the incident light processing section 107 is taken into the device through the opening section 106 and enters the incident light processing section 107. A light emitting section (not shown) is provided inside the opening section 106, and light emitted from the light emitting section travels toward the outside of the device via the opening section 106 and irradiates the colorimetry target facing the bottom surface 122.

An operation section 110 and a screen section 105 are disposed along the Y-axis direction in the upper surface 121. A cross key 111 is provided in the operation section 110, so as to be parallel to the X-axis direction and the Y-axis direction. A determination button 112 is provided in the operation section 110 at the center of the cross key 111. For example, the user can select various items by pressing the cross key 111 with respect to a plurality of menus displayed on the screen section 105, and can determine the selection or execute colorimetry by pressing the determination button 112.

The rear surface 123 is provided with a terminal 101 to which a cable connector 150 (see FIG. 4) attached to an end portion of a communication cable 151 (see FIG. 4) can be connected.

A control section 80 (see FIG. 6) of the colorimetry device 1 and a control section (not shown) of the colorimeter 100 are connected to each other via the communication cable 151, and the control section 80 of the colorimetry device 1 can perform various kinds of control of the colorimeter 100. The control section 80 includes a CPU (not shown), a nonvolatile memory, and the like, and the nonvolatile memory stores a control program for performing various controls of the colorimetry device 1 and the control section 80. For example, the control section 80 of the colorimetry device 1 can cause the colorimeter 100 to execute colorimetry at a predetermined timing, and the control section 80 of the colorimetry device 1 can receive the colorimetry result.

In FIG. 1, the right side surface 125 of the colorimeter 100 has an overhang portion 128, which overhangs in the lateral direction, that is, in the +X direction, at the upper portion thereof. Similarly, the left side surface 126 has an overhang portion 128, which overhangs in the lateral direction, that is, in the −X direction, at the upper portion thereof. In other words, the X-axis direction dimension of the colorimeter 100 is formed so as to increase in the +Z direction. Since the colorimeter 100 is formed in this manner, the holding property is improved. In the present embodiment, the overhang portion 128 is formed in a curved surface shape, but is not limited thereto, and may be formed so as to have angular portions.

Note that the overhang portion 128 is provided in the +Z direction with respect to the center of gravity (not shown) of the colorimeter 100 in the Z-axis direction.

Next, the configuration of the colorimetry device 1 will be described with reference to FIG. 2 and subsequent drawings.

Figure 2:
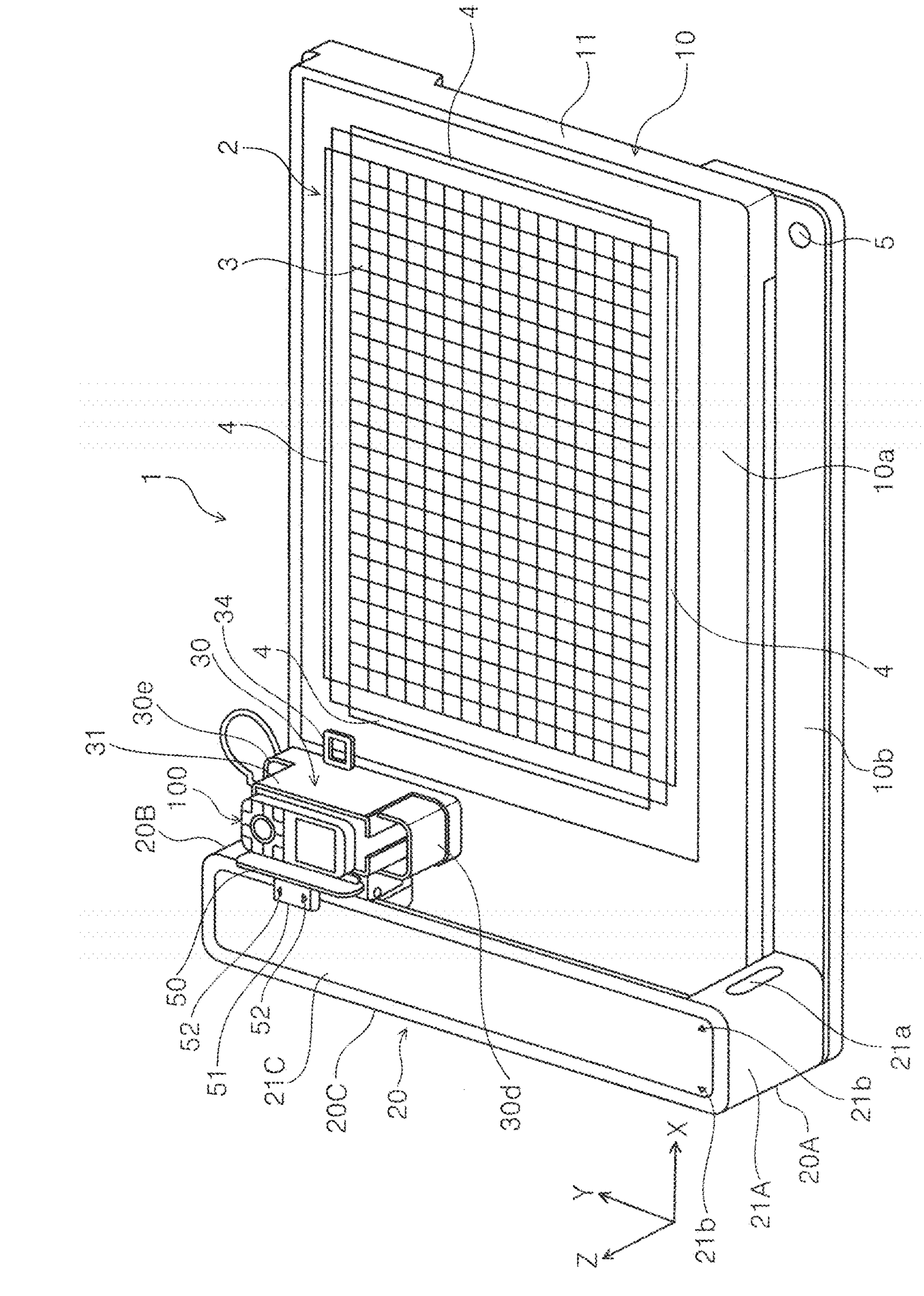
FIG. 2 is a perspective view of a colorimetry device.

The colorimetry device 1 of FIG. 2 is a device in which the colorimeter 100 is mounted on an accommodation section 31 constituting the carriage unit 30, and the carriage unit 30, that is, the colorimeter 100, scans a color chart 2 in a state where the color chart 2, which is an example of a measurement target, is supported by the support surface 10*a* of the support base 10.

As an example, the color chart 2 includes a plurality of color patches 3 disposed in a matrix. Different colors are applied to the plurality of color patches 3.

The support base 10 includes an upper frame 11 forming the support surface 10*a*, and a lower frame 12 (see FIG. 6) positioned below the upper frame 11. The lower frame 12 constitutes the bottom of the colorimetry device 1.

Figure 3:
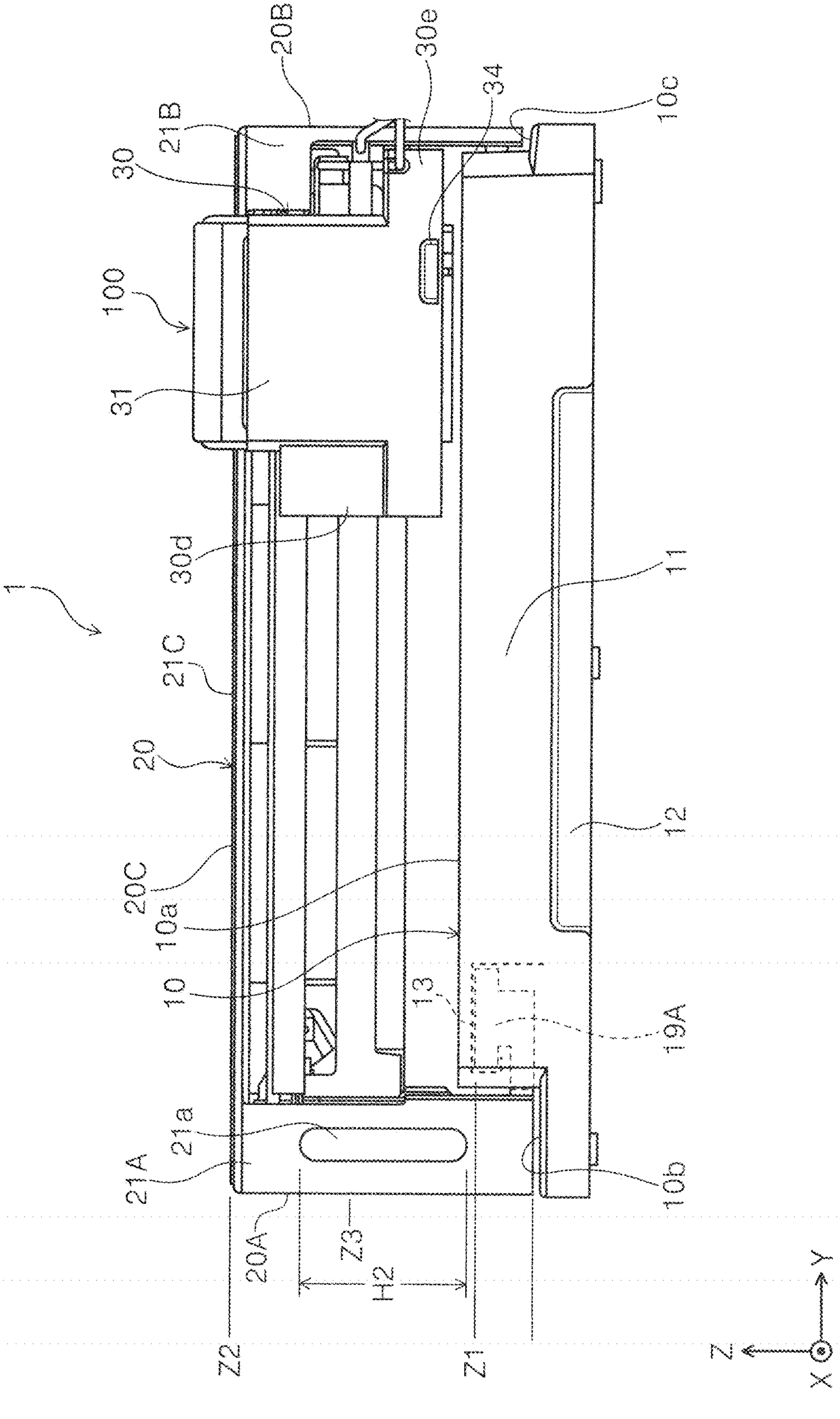
FIG. 3 is a side view of the colorimetry device.

A front step portion 10*b* which is one step lower than the support surface 10*a* is formed in the −Y direction with respect to the support surface 10*a* of the support base 10, that is, in the front portion, as shown in FIG. 3, and a rear step portion 10*c* which is one step lower than the support surface 10*a* is formed in the +Y direction with respect to the support surface 10*a* of the support base 10, that is, in the rear portion.

The position of the +X direction in the front step portion 10*b*, the power button 5 for turning on and off the power of the device is provided as shown in FIG. 2.

The colorimetry device 1 includes a gantry 20 that straddles the support surface 10*a* in the Y-axis direction. The gantry 20 is an example of a second direction moving section that is movable in the X-axis direction, which is the second direction.

The gantry 20 includes a first support section 20A rising from the front step portion 10*b* in the +Z direction, a second support section 20B rising from the rear step portion 10*c* in the +Z direction, a beam section 20C which is a section that extends in the Y-axis direction and that is supported by the first support section 20A and the second support section 20B.

A gap is secured between the beam section 20C and the support surface 10*a* and the color chart 2 can be disposed in the gap.

Hereinafter, the configuration of the gantry 20 will be further described.

Figure 6:
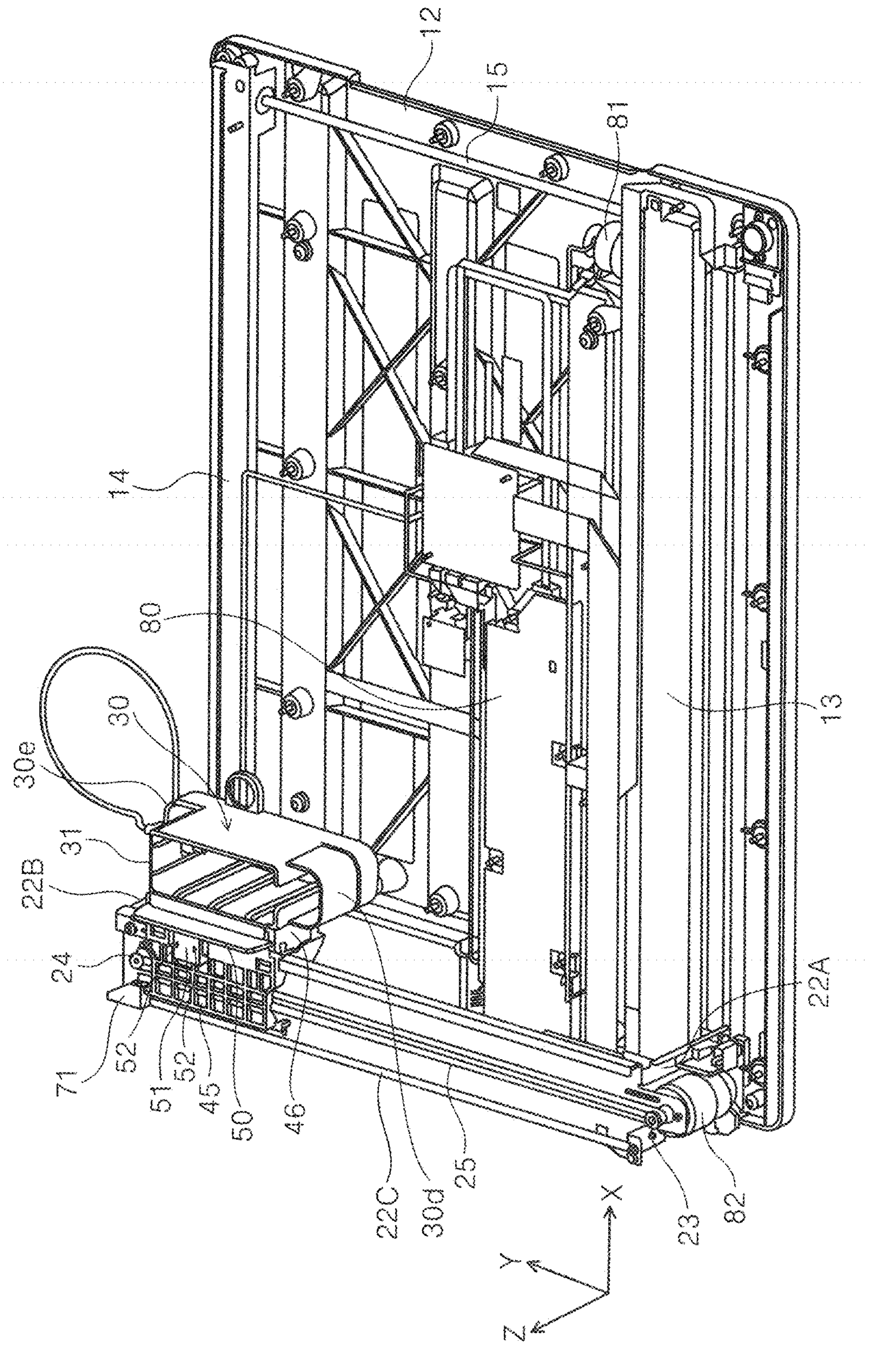
FIG. 6 is a perspective view of the colorimetry device in a state where an upper frame is removed.

In FIG. 6, reference symbol 22A denotes a first frame constituting a base body of the first support section 20A. Reference numeral 22B denotes a second frame constituting a base body of the second support section 20B. Reference numeral 22C denotes a beam section frame constituting a base body of the beam section 20C.

The first frame 22A, the second frame 22B, and the beam section frame 22C may be integrally formed as a whole or may be formed separately and then joined together. Each frame is not necessarily formed of one member and may be formed of a plurality of members.

The first frame 22A, the second frame 22B, and the beam section frame 22C are covered with a cover. Specifically, as shown in FIGS. 2 and 3, the first support section 20A has a first support section cover 21A for covering the first frame 22A. The second support section 20B has a second support section cover 21B for covering the second frame 22B. The beam section 20C has a beam section cover 21C for covering the beam section frame 22C.

The first support section cover 21A, the second support section cover 21B, and the beam section cover 21C may be integrally formed as a whole or may be formed separately and then joined together. Further, each cover is not necessarily formed of one member and may be formed of a plurality of members.

The beam section cover 21C is an example of a first cover member that covers the beam section frame 22C and a carriage slider 45.

As shown in FIG. 6, a front guide 13 extending in the X-axis direction is provided at a position on the front side of the lower frame 12. The front guide 13 is an example of the second guide section extending in the X-axis direction.

Figure 13:
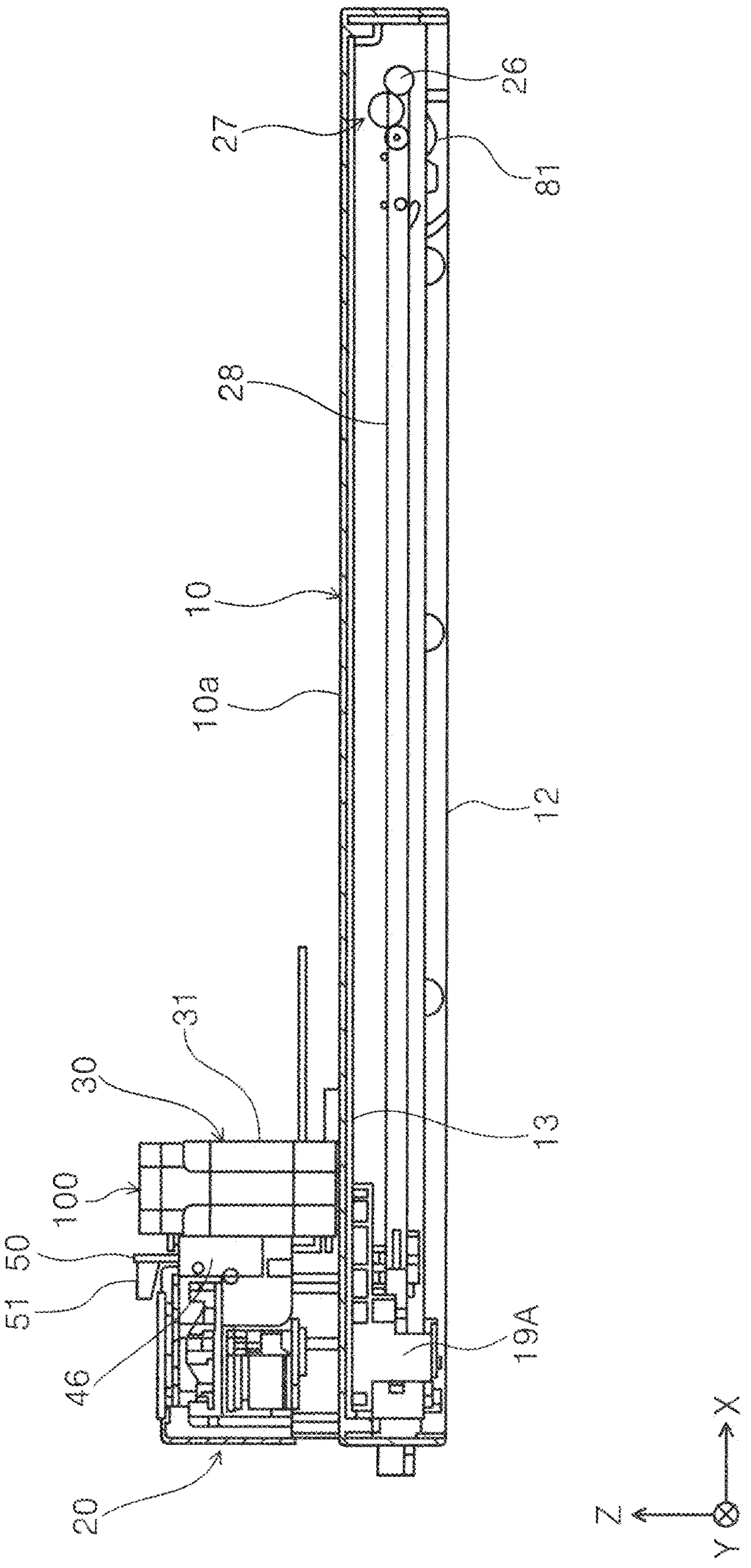
FIG. 13 is a cross-sectional view of the colorimetry device.

A front slider 19A (see FIG. 13) guided by the front guide 13 is provided on a lower end portion of the first frame 22A constituting the gantry 20. The front slider 19A is an example of a second guided section that is guided in the X-axis direction by the front guide 13.

The front slider 19A is fixed to a part of a second endless belt 28. The second endless belt 28 is wound around a second drive pulley 26 positioned at an end portion in the +X direction and a driven pulley (not shown) positioned at an end portion in the −X direction. The driving force of a gantry motor 81 is transmitted from the gantry motor 81 via the transmission section 27 to the second drive pulley 26. When the gantry motor 81 rotates, the second endless belt 28 circulates around and, by this, moves the first support section 20A, that is, the gantry 20, in the X-axis direction.

Figure 8:
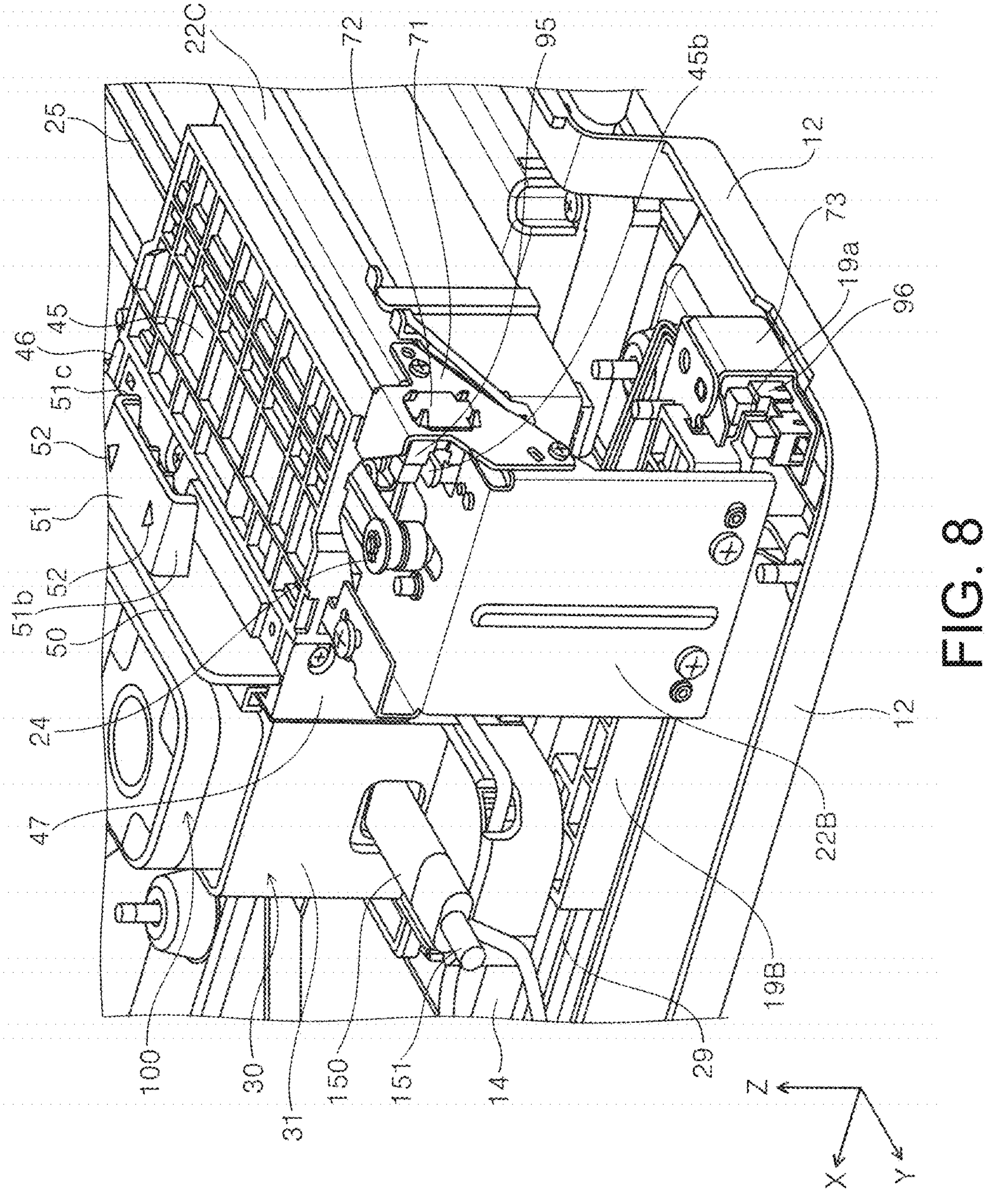
FIG. 8 is a perspective view showing the internal structure of a gantry.

Note that a similar structure is also provided at the position on the rear side of the lower frame 12. Specifically, as shown in FIG. 6, a rear guide 14 extending in the X-axis direction is provided at a position on the lower frame 12 in the +Y direction, that is, on the rear side. A rear slider 19B (see FIG. 8) guided by the rear guide 14 is provided at a lower end portion of the second frame 22B constituting the gantry 20. As shown in FIG. 8, the rear slider 19B is fixed to a part of a third endless belt 29. Similarly to the second endless belt 28 described above, the third endless belt 29 is wound around a drive pulley (not shown) and a driven pulley (not shown) which are disposed separated by a gap therebetween along the X-axis direction.

Power of the gantry motor 81 is transmitted to the drive pulley (not shown) via the transmission shaft 15 (see FIG. 6) and, by this, the third endless belt 29 circulates around rounds and the second support section 20B moves in the X-axis direction.

That is, the power is transmitted from the gantry motor 81 to the gantry 20 at two positions of the −Y direction, that is, the front side and the +Y direction, that is, the rear side in the Y-axis direction, that is, the device front-rear direction.

Note that as shown in FIG. 8, a gantry sensor 96 is provided at an end portion of the rear guide 14 in the −X direction. The gantry sensor 96 is an optical sensor and, when the rear slider 19B moves to the end portion in the −X direction, a detection target section 19*a* formed on the rear slider 19B can block the optical axis of the detection light of the gantry sensor 96. Accordingly, the control section 80 (see FIG. 6) of the colorimetry device 1 can detect that the gantry 20 has moved to the end portion in the −X direction, that is, to a home position.

The gantry sensor 96 is fixed to a second restriction member 73. The second restriction member 73 is fixed to the lower frame 12. The rear slider 19B can contact the second restriction member 73. Therefore, the second restriction member 73 restricts the movement limit of the rear slider 19B in the −X direction. Note that the position at which the gantry sensor 96 detects the detection target section 19*a* formed on the rear slider 19B, that is, the home position of the gantry 20, is set slightly further in the +X direction than the position of the gantry 20 when the rear slider 19B is in contact to the second restriction member 73.

The second restriction member 73 functions to restrict the movement limit in the −X direction of the gantry 20 in addition to enabling attachment of the gantry sensor 96 for detecting the home position of the gantry 20, so it is possible to reduce costs by the sharing members. In addition, the relationship between the home position of gantry 20 and the movement limit position in the −X direction is precisely determined.

Next, a configuration for moving the carriage unit 30 along the Y-axis direction will be described.

In FIG. 8, the carriage unit 30 has the carriage slider 45. In the carriage slider 45, a front attachment section 46 and a rear attachment section 47 constituting the carriage unit 30 are provided separated by a gap along the Y-axis direction. The accommodation section 31 for accommodating the colorimeter 100 is provided in the front attachment section 46 and the rear attachment section 47.

The carriage slider 45 is provided in the beam section frame 22C so as to be slidable in the Y-axis direction. The beam section frame 22C extending in the Y-axis direction is an example of a first guide section, and the carriage slider 45 is an example of a first guided section guided in the Y-axis direction by the beam section frame 22C.

Figure 7:
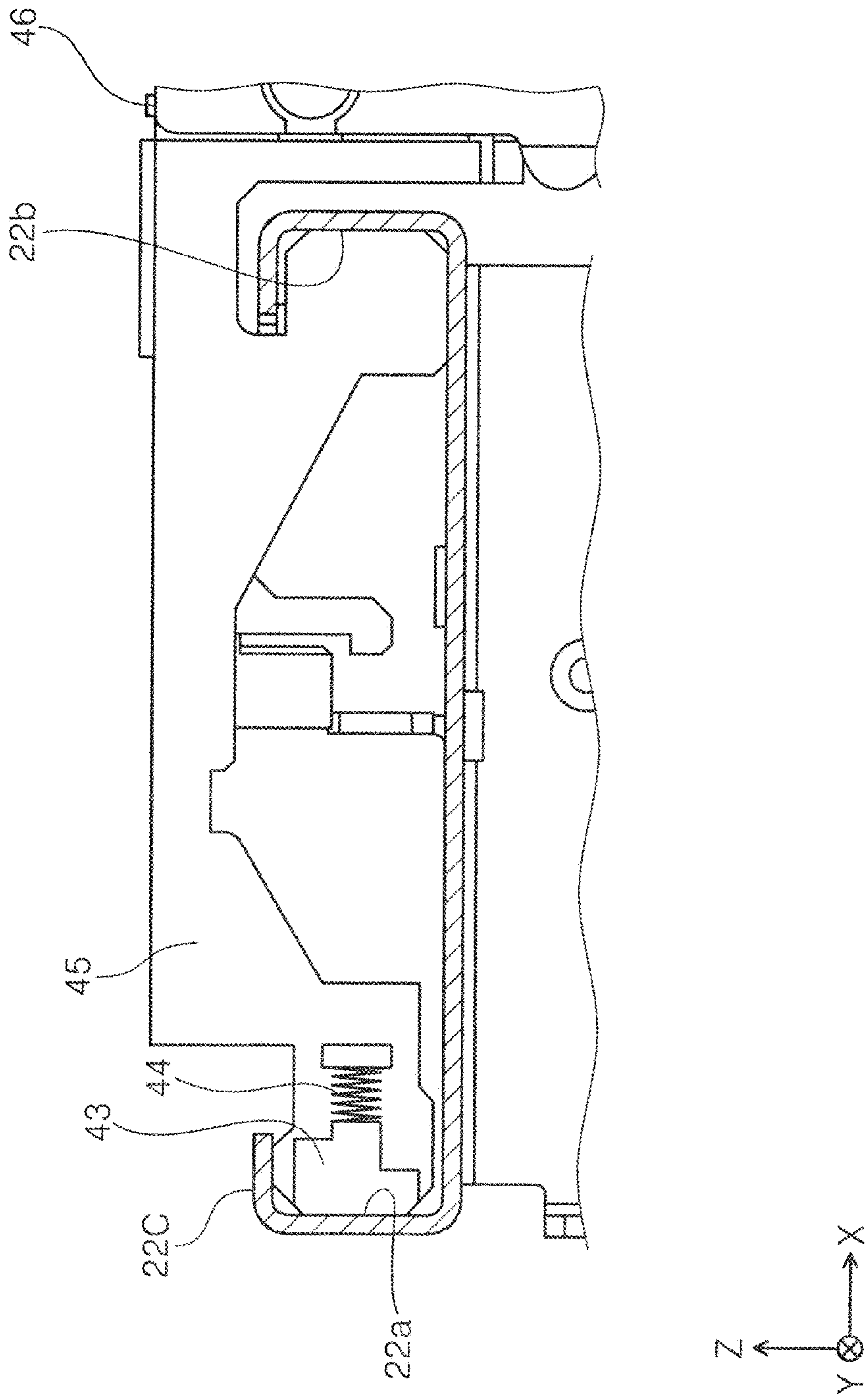
FIG. 7 is a cross-sectional view of a beam section frame.

As shown in FIG. 7, the beam section frame 22C has a first guide surface 22*a* and a second guide surface 22*b* on its inner side. The first guide surface 22*a* and the second guide surface 22*b* form surfaces parallel to the Y-Z plane. The carriage slider 45 has a pressing slider 43 which can advance and retreat with respect to the first guide surface 22*a*. The pressing slider 43 is pressed toward the first guide surface 22*a* by a spring 44 which is an example of a pressing member. With such a configuration, the carriage slider 45 is pressed against the second guide surface 22*b*, and rattling when moving in the Y-axis direction is suppressed.

Note that a plurality of pressing sliders 43 and springs 44 may be provided along the Y-axis direction.

The beam section frame 22C is not limited to the shape shown in FIG. 7 and may be a shaft body such as a solid shaft or a hollow shaft and, in this case, the carriage slider 45 has a shaft hole through which the shaft body is inserted. In such a configuration, a configuration similar to the pressing slider 43 and the spring 44 described above may be provided and the shaft hole may be pressed against the circumferential surface of the shaft body to suppress rattling.

Note that the same structure as that shown in FIG. 7 can be applied to the front guide 13 and the front slider 19A, which guide the first support section 20A of the gantry 20 in the X-axis direction. The same structure as that shown in FIG. 7 can be applied to the rear guide 14 and the rear slider 19B, which guide the second support section 20B of the gantry 20 in the X-axis direction.

Next, as shown in FIG. 6, a carriage motor 82 is provided in the first frame 22A constituting the first support section 20A of the gantry 20. A first drive pulley 23 is provided on a motor shaft of the carriage motor 82. A first driven pulley 24 is provided at an end portion of the beam section frame 22C in the +Y direction. A first endless belt 25 is wound around the first drive pulley 23 and the first driven pulley 24. The carriage slider 45 has a belt gripping section 45*c* (see FIG. 10) that grips a portion of the first endless belt 25. That is, the carriage slider 45 is fixed to a part of the first endless belt 25. Therefore, when the carriage motor 82 rotates, the first endless belt 25 circulates around and the carriage slider 45, that is, the carriage unit 30, moves in the Y-axis direction.

In FIG. 6, reference symbol 80 denotes the control section. The control section 80 controls the gantry motor 81, the carriage motor 82, and a raising and lowering motor 83 (see FIGS. 17 and 18) (to be described later). The carriage motor 82 is an example of a first motor and the gantry motor 81 is an example of a second motor.

Note that as shown in FIG. 8, a carriage sensor 95 is provided at an end portion of the beam section frame 22C in the +Y direction. The carriage sensor 95 is an optical sensor and, when the carriage slider 45 moves to the end portion in the +Y direction, a detection target section 45*b* (also refer to FIG. 11) formed on the carriage slider 45 can block the optical axis of the detection light of the carriage sensor 95. Thus, the control section 80 (see FIG. 6) of the colorimetry device 1 can detect that the carriage unit 30 has moved to the end portion in the +Y direction, that is, to a home position.

The carriage sensor 95 is fixed to a first restriction member 71. The first restriction member 71 is fixed across the beam section frame 22C and the second frame 22B. The carriage slider 45 can contact the first restriction member 71.

Figure 11:
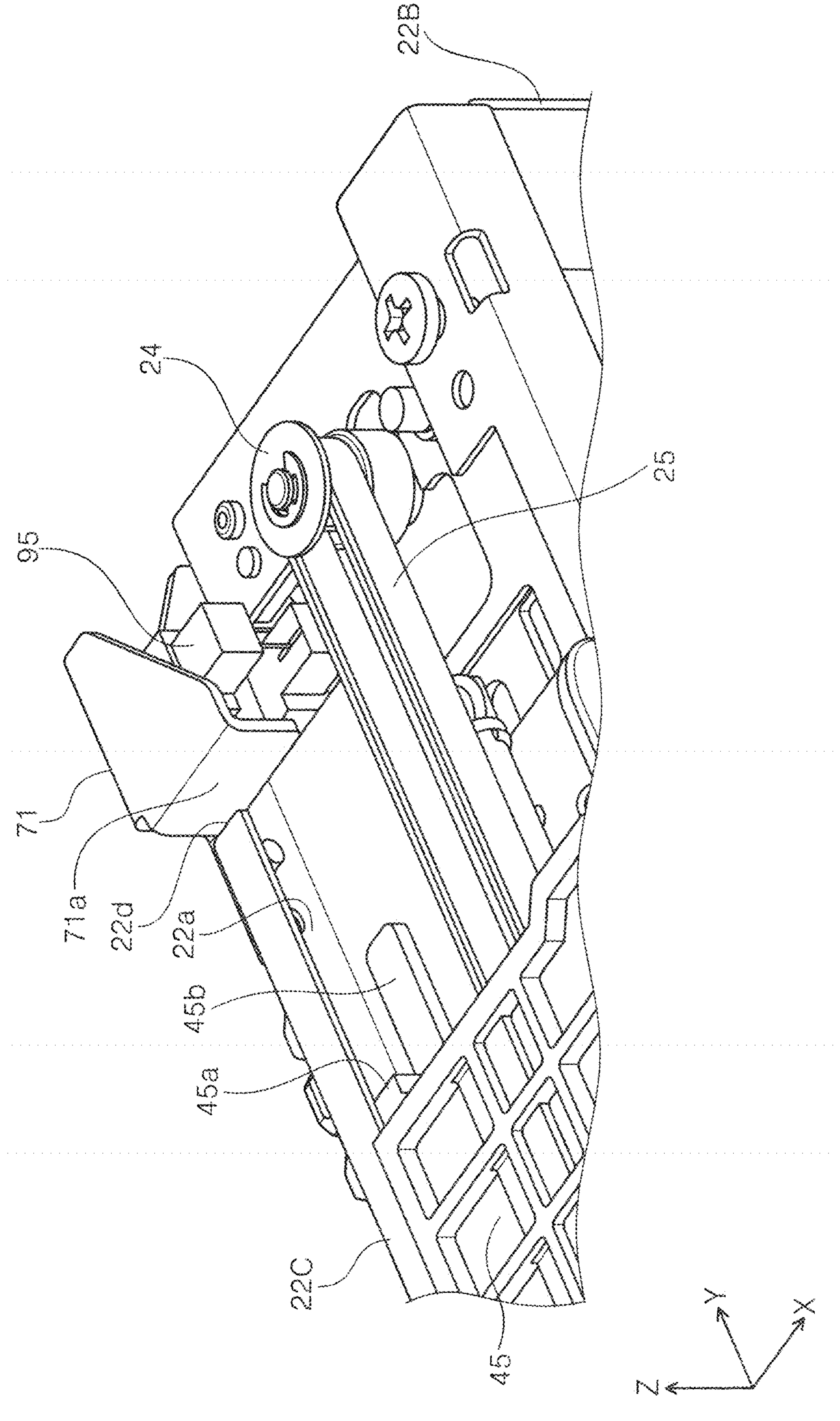
FIG. 11 is a perspective view showing the internal structure of the gantry.

As shown in FIG. 11, the carriage slider 45 is provided with a contact section 45*a*. The first restriction member 71 is provided with a contact frame section 71*a* parallel to the X-Z plane, and the contact section 45*a* of the carriage slider 45 contacts the contact frame section 71*a* of the first restriction member 71, whereby the movement limit of the carriage slider 45 in the +Y direction is restricted.

Note that the position at which the carriage sensor 95 detects the detection target section 45*b* formed on the carriage slider 45, that is, the home position of the carriage unit 30, is set slightly further in the −Y direction than the position of the carriage unit 30 when the carriage slider 45 is in contact with the first restriction member 71.

In addition to enabling attachment of the carriage sensor 95 for detecting the home position of the carriage unit 30, the first restriction member 71, functions to restrict the movement limit of the carriage unit 30 in the +Y direction. Thus, costs can be reduced by sharing members. In addition, the relationship between the home position of the carriage unit 30 and the movement limit position in the +Y direction is precisely determined.

Note that in FIG. 8, reference symbol 72 denotes a fixing plate for fixing the carriage sensor 95 to the first restriction member 71.

Figure 12:
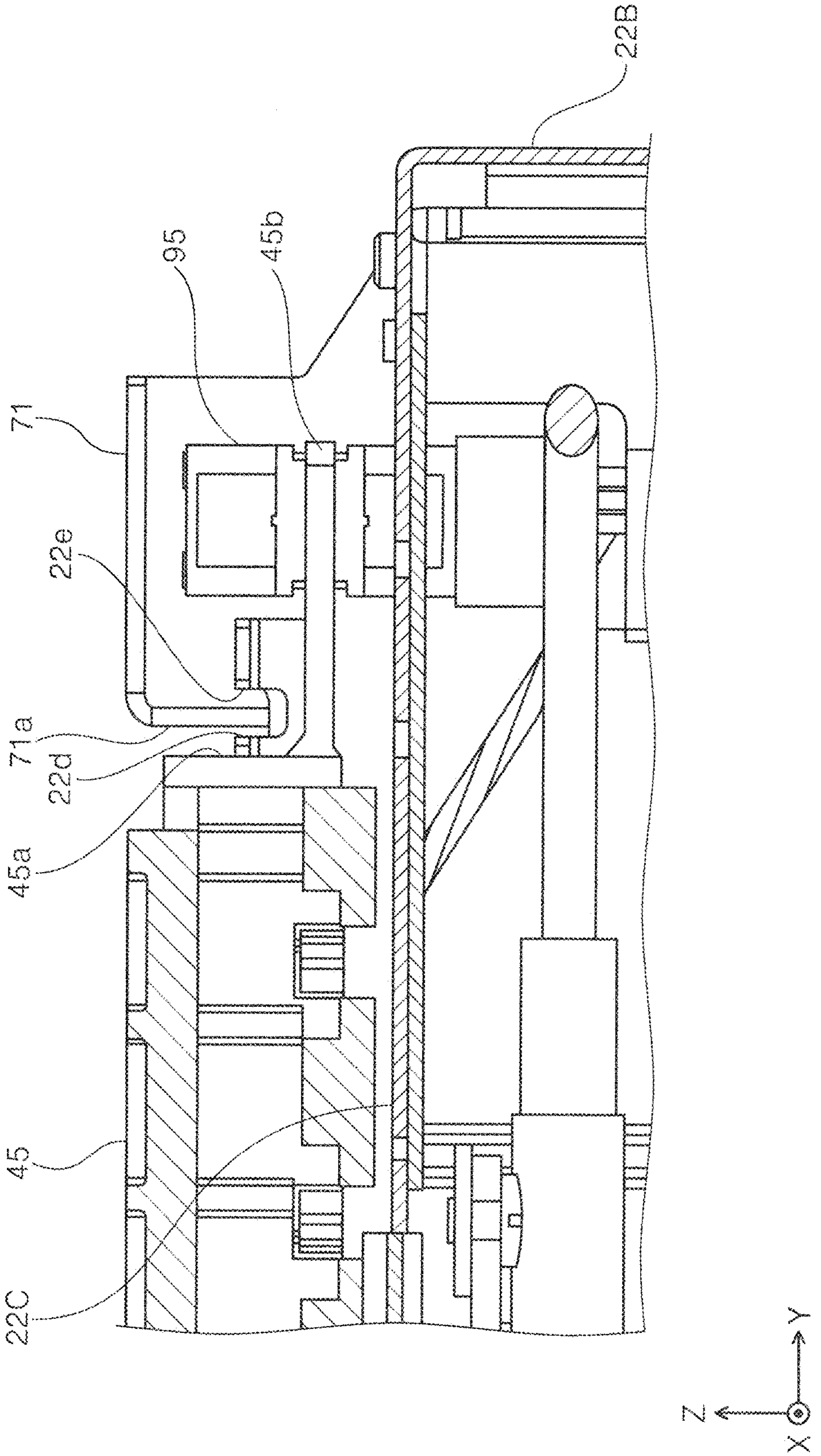
FIG. 12 is a cross-sectional view of the gantry.

As shown in FIGS. 11 and 12, restriction surfaces 22*d* and 22*e* are formed on the beam section frame 22C so as to sandwich the contact frame section 71*a* of the first restriction member 71 in the Y-axis direction. Thus, the contact frame section 71*a* is supported in the Y-axis direction, and the position of the contact frame section 71*a* in the Y-axis direction is appropriately determined.

Figure 4:
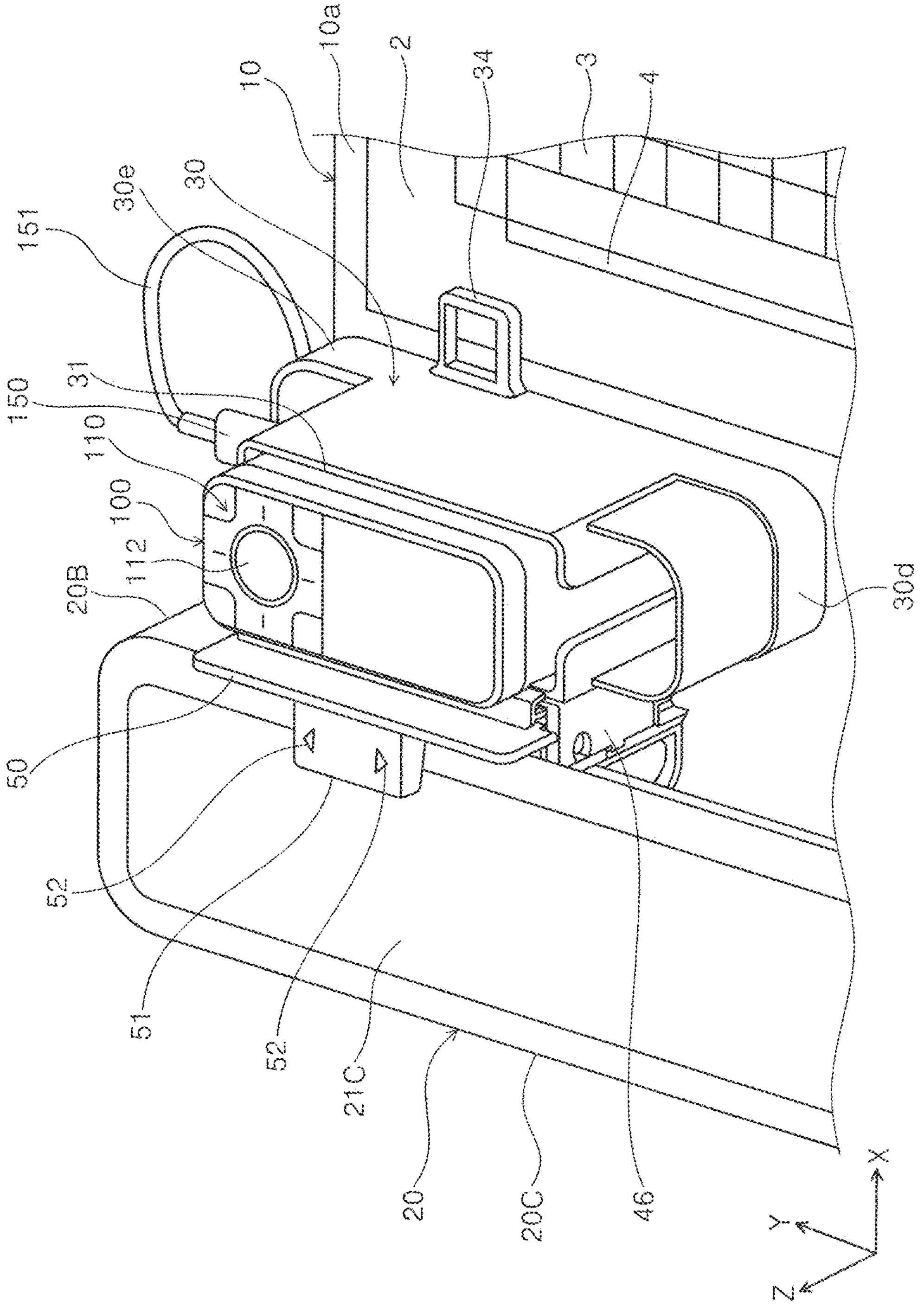
FIG. 4 is a perspective view of a carriage unit on which a colorimeter is mounted.
Figure 5:
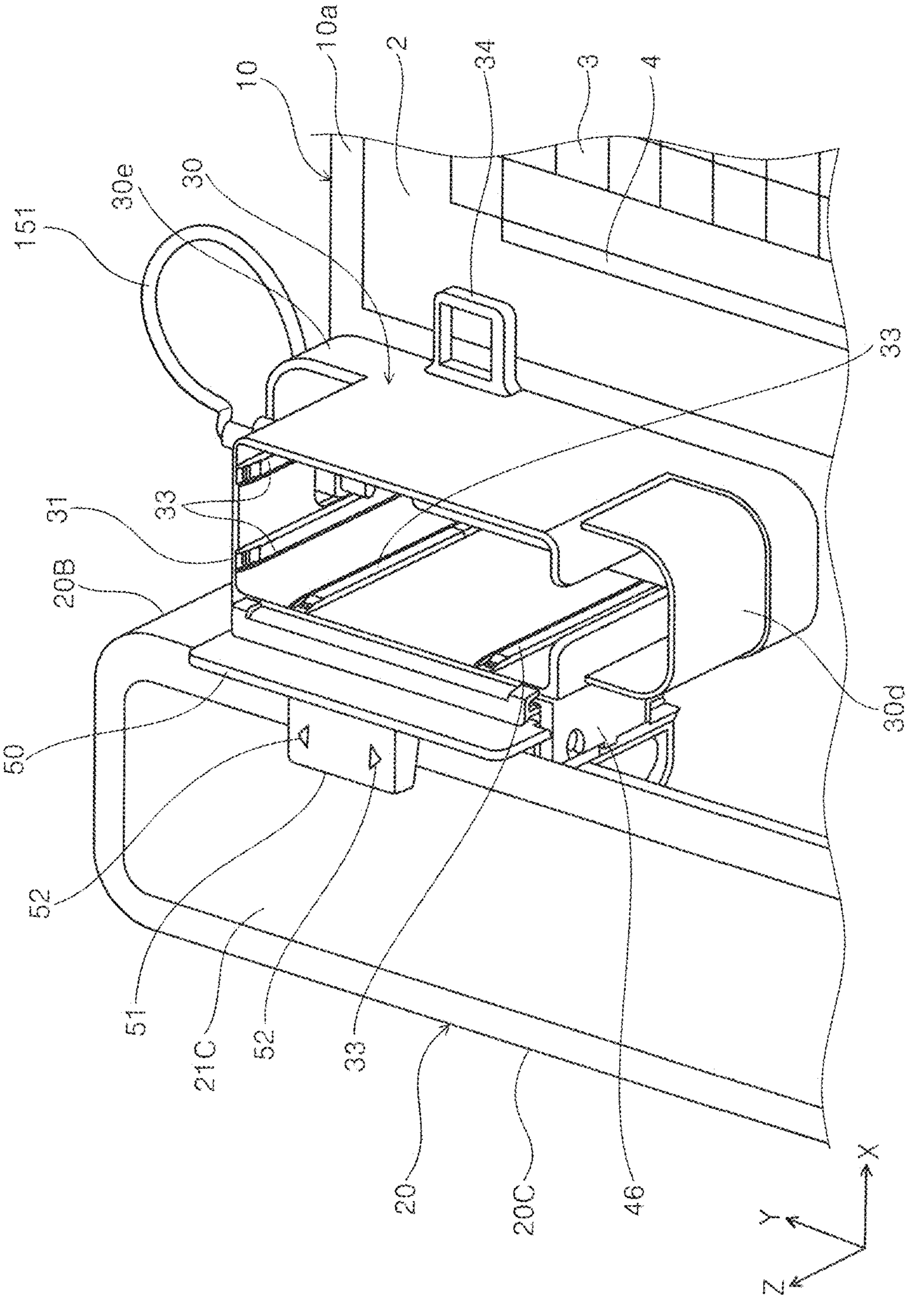
FIG. 5 is a perspective view of the carriage unit from which the colorimeter is removed.

Next, as shown in FIGS. 4 and 5, the carriage unit 30 has the accommodation section 31 for accommodating the colorimeter 100. The accommodation section 31 is open in the +Z direction and the −Z direction, and the colorimeter 100 can be mounted into the accommodation section 31 by dropping the colorimeter 100 from above to below the accommodation section 31. The opening section 106 (see FIG. 1) of the colorimeter 100 can face the color chart 2 in a state in which the colorimeter 100 is mounted on the accommodation section 31.

The colorimeter 100 can be removed from the accommodation section 31 by lifting the colorimeter 100 upward in a state in which the colorimeter 100 is mounted on the accommodation section 31.

A front overhang section 30*d* is provided integrally with the accommodation section 31 in the −Y direction with respect to the accommodation section 31, and a rear overhang section 30*e* is provided integrally with the accommodation section 31 in the +Y direction with respect to the accommodation section 31.

Figure 14:
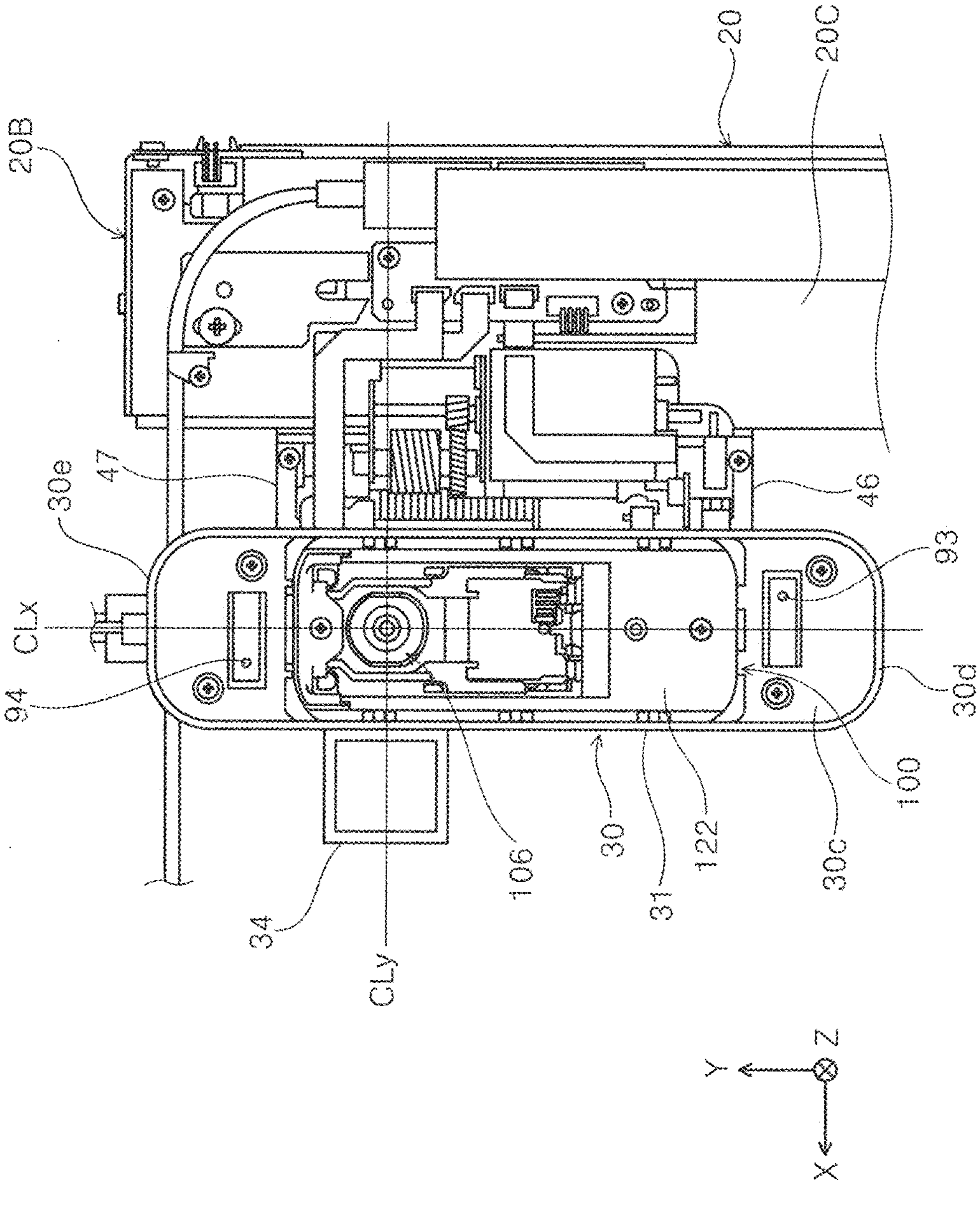
FIG. 14 is a plan view of the carriage unit and the gantry on which the colorimeter is mounted, as viewed from below.

As shown in FIG. 14, a front sensor 93 is provided at the bottom of the front overhang section 30*d*. The front sensor 93 includes and is constituted by a light emitting section (not shown) that emits detection light and a light receiving section (not shown) that receives reflected light.

Similarly, a rear sensor 94 is provided at the bottom of the rear overhang section 30*e*. The rear sensor 94 includes and is constituted by a light emitting section (not shown) that emits detection light and a light receiving section (not shown) for receives reflected light.

The front sensor 93 and the rear sensor 94 emit detection light to the color chart 2 and receive reflected light from the color chart 2. A black frame 4 is formed around the color patch 3 in the color chart 2 (see FIG. 2), and the control section 80 can grasp the current position of the carriage unit 30 with respect to the color chart 2 by detecting the black frame 4 using the front sensor 93 and the rear sensor 94.

Figure 17:
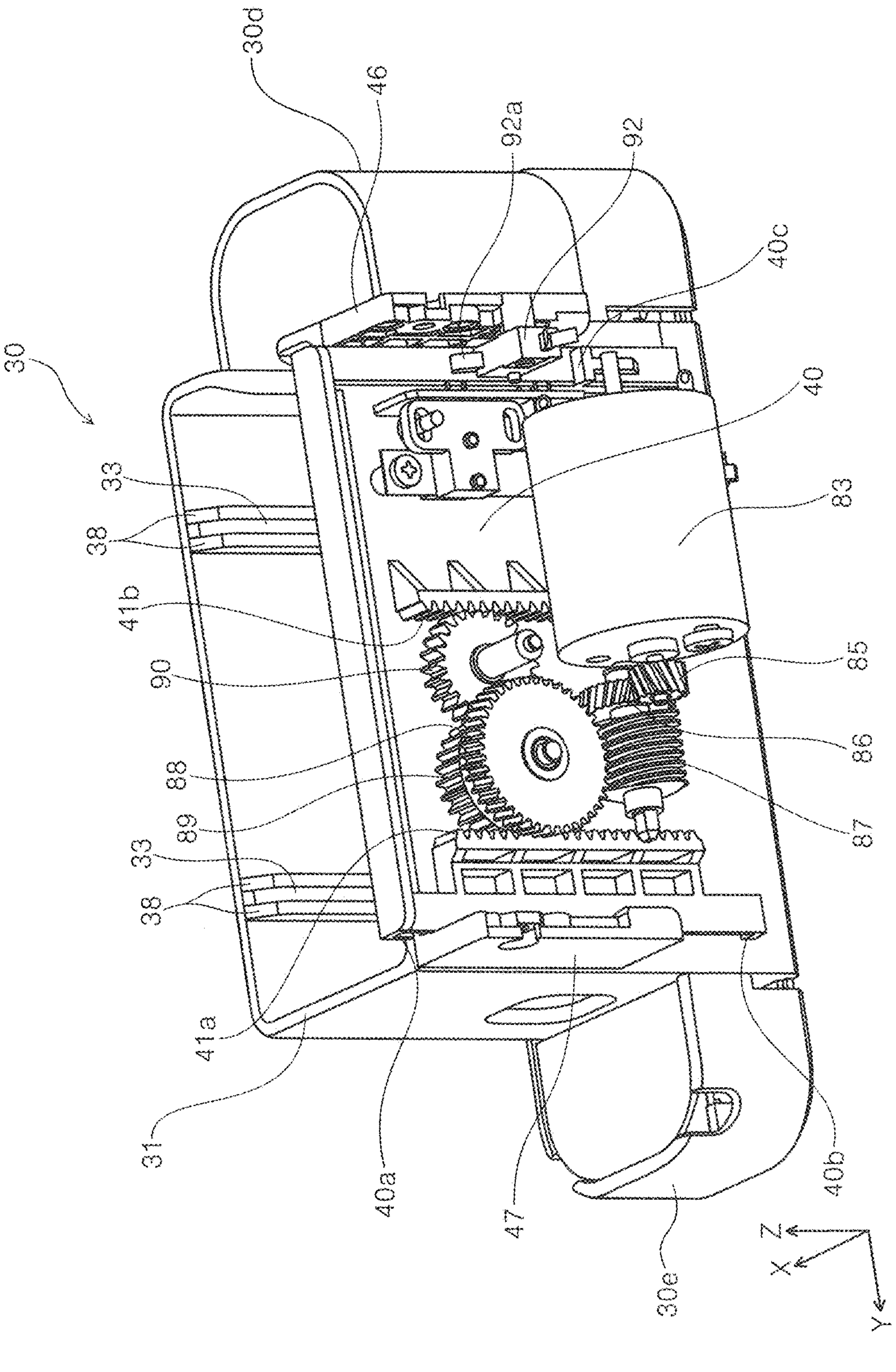
FIG. 17 is a perspective view of a mechanism for raising and lowering the carriage unit.
Figure 18:
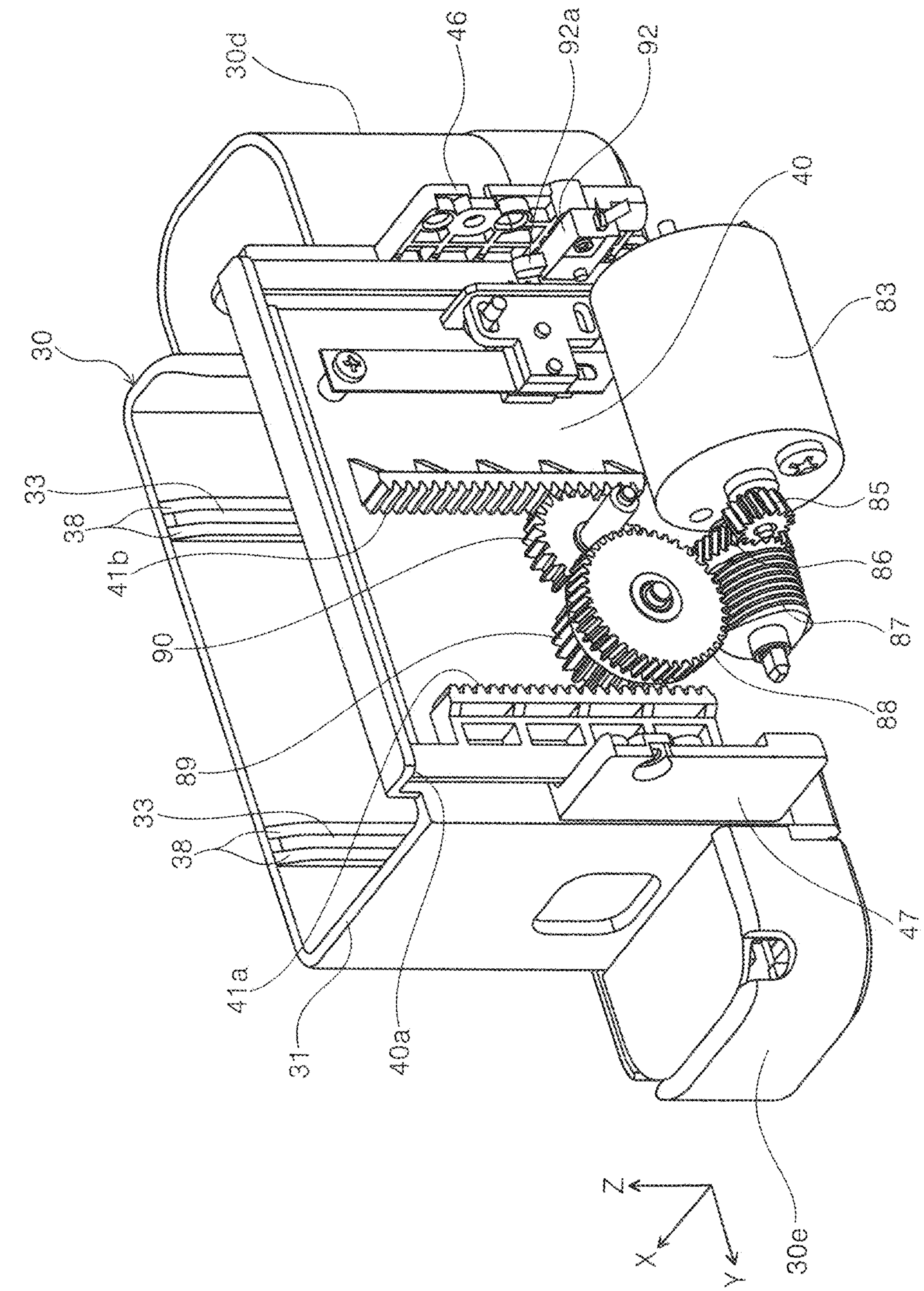
FIG. 18 is a perspective view of the mechanism for raising and lowering the carriage unit.

Next, as shown in FIGS. 17 and 18, a driven wall 40 is provided integrally with the accommodation section 31 in the −X direction with respect to the accommodation section 31. Although the carriage slider 45 is not shown in FIGS. 17 and 18, a front attachment section 46 is fixed in the −Y direction, and a rear attachment section 47 is fixed in the +Y direction, with respect to the carriage slider 45.

The driven wall 40, that is, the accommodation section 31, is provided to be slidable in the Z-axis direction with respect to the front attachment section 46 and the rear attachment section 47.

On the driven wall 40, rack sections 41*a* and 41*b* are provided along the Z-axis direction so as to face each other. A first pinion gear 89 meshes with the rack section 41*a* and a rack pinion mechanism is constituted by the rack section 41*a* and the first pinion gear 89. A second pinion gear 90 meshes with the rack section 41*b* and a rack and pinion mechanism is constituted by the rack section 41*b* and the second pinion gear 90.

The first pinion gear 89 is integrally provided with a worm wheel 88.

The first pinion gear 89, the worm wheel 88, and the second pinion gear 90 are provided on the beam section 20C of the gantry 20, which is not shown in FIGS. 17 and 18.

A raising and lowering motor 83, a driven gear 86, and a worm gear 87 are provided on the beam section 20C of the gantry 20, which is not shown in FIGS. 17 and 18. A motor shaft of the raising and lowering motor 83 is provided with a motor gear 85, and power is transmitted from the motor gear 85 to the driven gear 86. The worm gear 87 is integrally provided with the driven gear 86, and the worm wheel 88 meshes with the worm gear 87, so that a driving force is transmitted from the worm gear 87 to the worm wheel 88.

According to the above described configuration, when the raising and lowering motor 83 rotates, the accommodation section 31, that is, the carriage unit 30, is displaced in the Z-axis direction.

Note that the worm gear 87 has a self-locking function that prevents rotation due to load from the worm wheel 88 side while in a state where the raising and lowering motor 83 is stopped, so a separate lock mechanism for maintaining the height of the carriage unit 30 is unnecessary and it is possible to reduce the size and cost of the colorimetry device 1.

However, in a case where it is desired to manually move the accommodation section 31 in the Z-axis direction, other gears may be used instead of the worm gear 87 and the worm wheel 88. In this case, a pinching section (not shown) for manually moving the accommodation section 31 in the Z-axis direction may be provided at an appropriate position of the accommodation section 31.

Note that the movement limit of the driven wall 40 in the +Z direction can be restricted by the upper limit restricted section 40*b* formed on the driven wall 40 contacting lower ends of the front attachment section 46 and the rear attachment section 47. In FIG. 17, only the upper limit restricted section 40*b* that can contact the lower end of the rear attachment section 47 is shown, and the upper limit restricted section 40*b* that can contact the lower end of the front attachment section 46 is at a hidden position.

However, the movement limit of the driven wall 40 in the +Z direction in the present embodiment is restricted by a detection signal of an upper limit sensor 92. That is, the beam section 20C of the gantry 20 (not shown in FIGS. 17 and 18) is provided with the upper limit sensor 92, and a detection section 92*a* of the upper limit sensor 92 is configured to be able to contact a detection target section 40*c* formed on the driven wall 40. When the driven wall 40 is raised, the detection target section 40*c* contacts the detection section 92*a* of the upper limit sensor 92 as shown by the change between FIG. 17 and FIG. 18, and thereby the detection signal of the upper limit sensor 92 changes. The control section 80 (see FIG. 6), which raises the carriage unit 30, stops the raising and lowering motor 83 based on the change in the detection signal of the upper limit sensor 92.

The movement limit of the driven wall 40 in the −Z direction can be restricted by the lower limit restricted section 40*a* formed on the driven wall 40 contacting the upper ends of the front attachment section 46 and the rear attachment section 47. In FIG. 17, only the lower limit restricted section 40*a* that can contact the upper end of the rear attachment section 47 is shown, and the lower limit restricted section 40*a* that can contact the upper end of the front attachment section 46 is in a hidden position.

However, actually, the movement limit of the driven wall 40, that is, the accommodation section 31, in the −Z direction is restricted by the bottom surface 30*c* (see FIG. 19 to FIG. 22) of the accommodation section 31 contacting the support surface 10*a* or the color chart 2.

Here, the height control of the accommodation section 31 by the control section 80 will be described with reference to FIG. 19 to FIG. 22. Note that FIG. 19 to FIG. 22 schematically show the configurations of the colorimetry device 1 and the colorimeter 100 as a whole.

Figure 19:
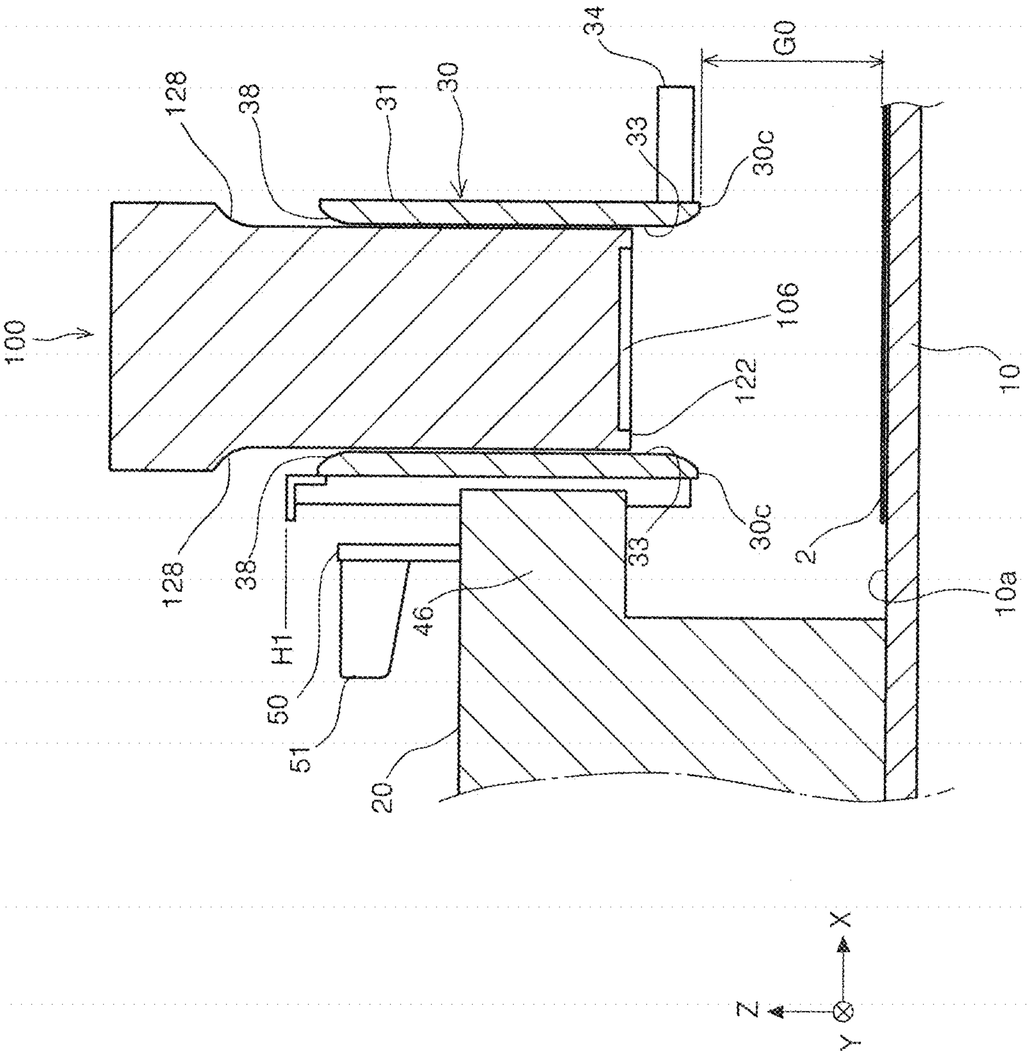
FIG. 19 is a diagram schematically showing the positional relationship between the carriage unit and the colorimeter when the colorimeter is mounted to the carriage unit.

As shown in FIG. 19, when the colorimeter 100 is mounted on the accommodation section 31 of the carriage unit 30, a gap G0 is provided between the bottom surface 30*c* of the carriage unit 30 and the color chart 2 in the Z-axis direction. This position is referred to as a mounting position of the accommodation section 31. When the colorimeter 100 is mounted into or removed from the accommodation section 31, the control section 80 of the colorimetry device 1 positions the accommodation section 31 at the mounting position.

Support sections 38 are provided at the upper portion of the accommodation section 31, and when the colorimeter 100 is accommodated in the accommodation section 31, the overhang portion 128 of the colorimeter 100 catches on the support section 38. That is, in a state where the colorimeter 100 is mounted on the carriage unit 30, the support sections 38 support the overhang portion 128, whereby the position of the colorimeter 100 in the Z-axis direction with respect to the carriage unit 30 is determined.

In this state, the bottom surface 122 of the colorimeter 100 protrudes downward from the bottom surface 30*c* of the carriage unit 30.

Figure 20:
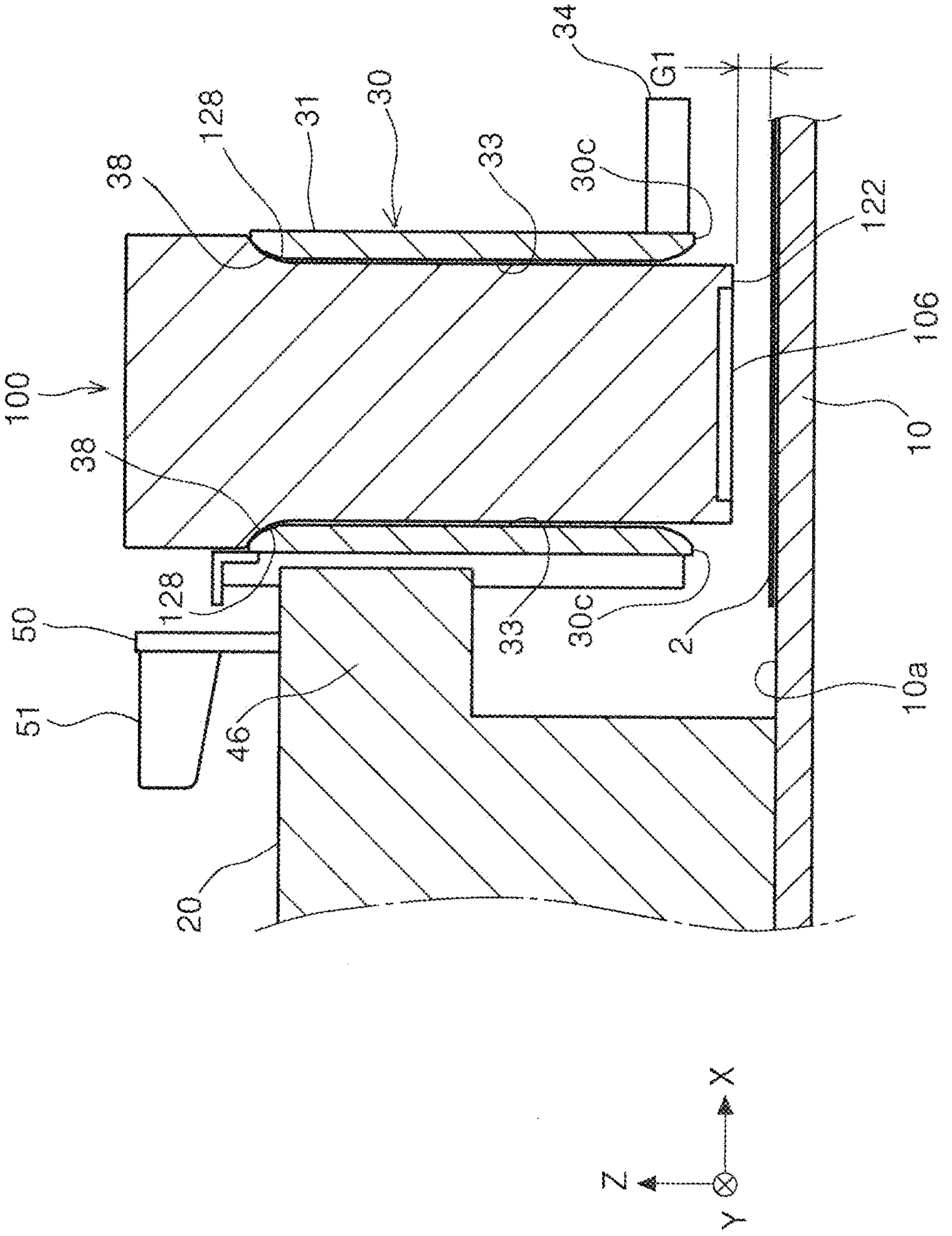
FIG. 20 is a diagram schematically showing the positional relationship between the carriage unit and the colorimeter when the carriage unit moves along the colorimetry target.

When the carriage unit 30 is moved with respect to the color chart 2 after the colorimeter 100 is mounted, then as shown in FIG. 20, the control section 80 provides a gap G1 smaller than the gap G0 between the bottom surface 122 of the colorimeter 100 and the color chart 2.

Figure 21:
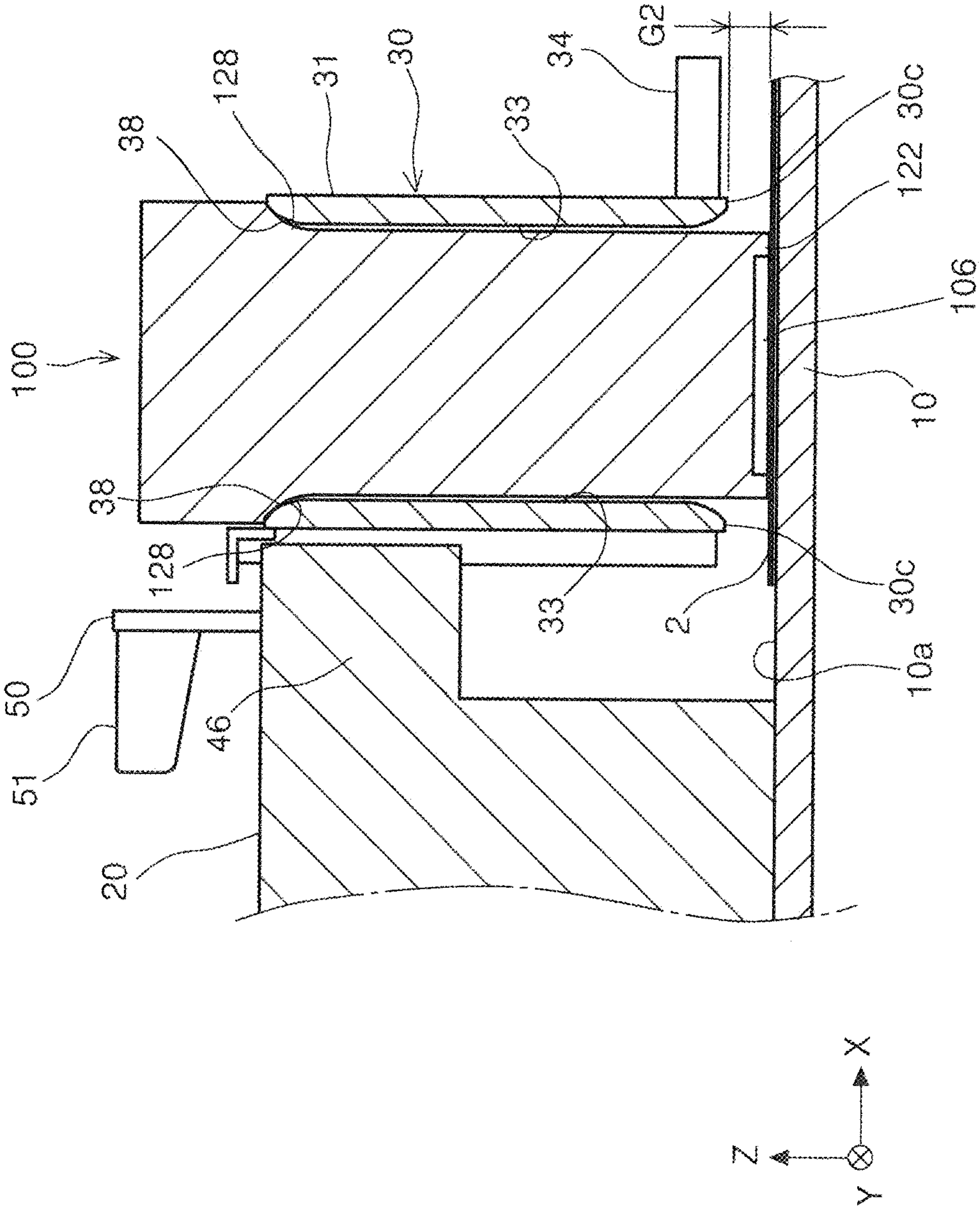
FIG. 21 is a diagram schematically showing the positional relationship between the carriage unit and the colorimeter when a bottom surface of the colorimeter is in contact with the colorimetry target.

Next, when color measurement is to be performed, then, as shown by the change from FIG. 20 to FIG. 21, the control section 80 lowers the carriage unit 30 to a position where the bottom surface 122 of the colorimeter 100 is in contact with the color chart 2. The reference symbol G2 in FIG. 21 indicates a Z-axis direction gap between the bottom surface 30*c* of the carriage unit 30 and the color chart 2 at the moment when the bottom surface 122 of the colorimeter 100 contacts the color chart 2.

Figure 22:
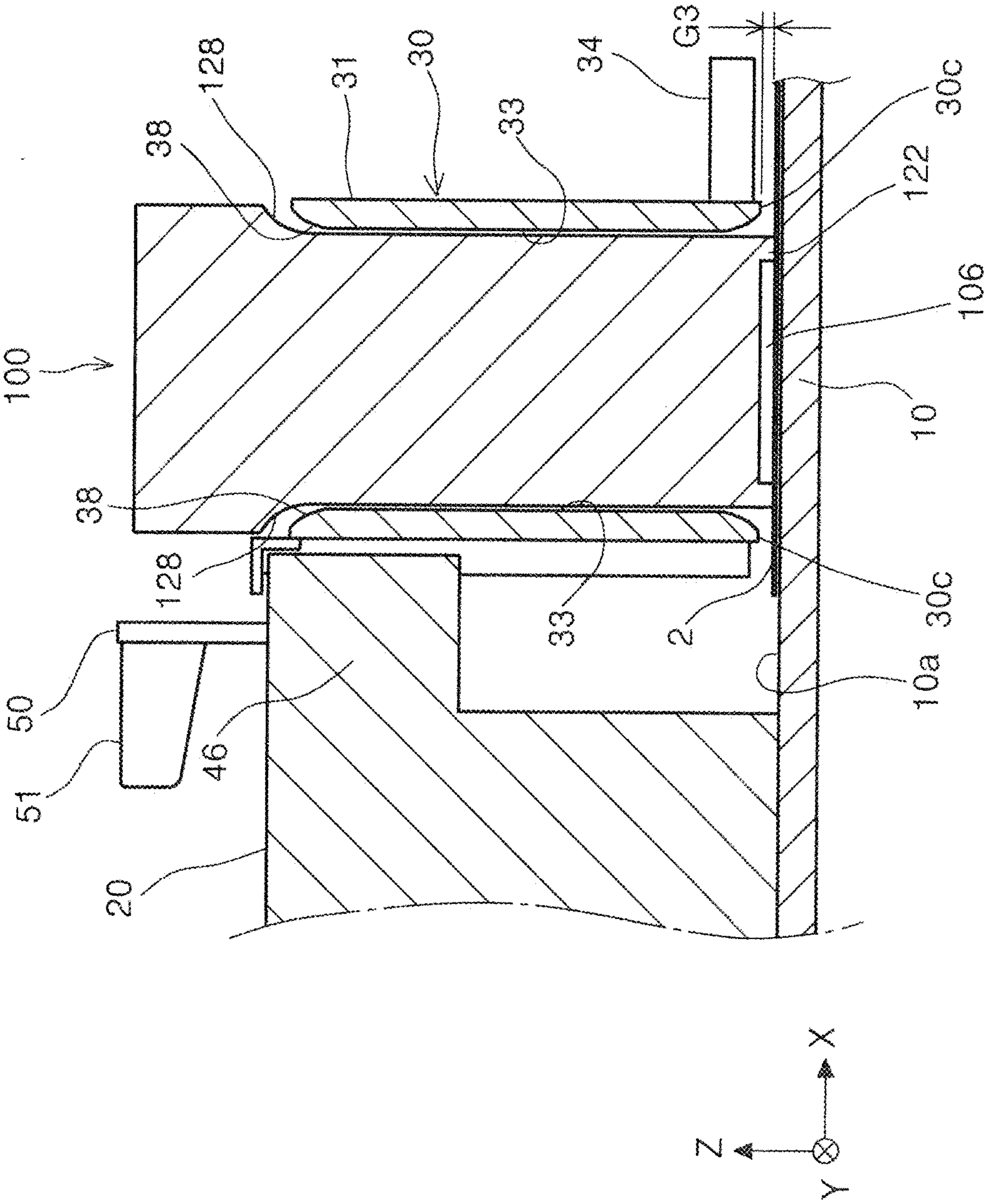
FIG. 22 is a diagram schematically showing the positional relationship between the carriage unit and the colorimeter when measuring colors of the colorimetry target is colorimetry.

The control section 80 further lowers the carriage unit 30 from this state as shown by a change from FIG. 21 to FIG. 22, and performs colorimetry in this state. In FIG. 22, reference symbol G3 denotes a Z-axis direction gap between the bottom surface 30*c* of the carriage unit 30 and the color chart 2 when colorimetry is performed.

In the state of FIG. 22, the state in which the support sections 38 provided at the upper end of the accommodation section 31 support the overhang portion 128 of the colorimeter 100 is released, and the overhang portion 128 is separated from the support sections 38 in the +Z direction.

In such a state that the support sections 38 support the colorimeter 100, the colorimeter 100 protrudes from the bottom surface 30*c* of the accommodation section 31 (carriage unit 30) toward the support base 10, and when colorimetry of the color chart 2 by the colorimeter 100 is to be performed, the control section 80 lowers the carriage unit 30 to a position where the bottom surface 122 of the colorimeter 100 contacts the color chart 2 and then further performs lowering control for lowering the carriage unit 30 within a range where the bottom surface 30*c* of the carriage unit 30 does not contact the color chart 2.

During the lowering control, a contact surface 33 provided on the inner side of the accommodation section 31 and the side surface of the colorimeter 100 rub against each other. Therefore, it is desirable that the contact surface 33 is a low-friction surface that slides well.

Next, a first operation section 51 provided on the carriage unit 30 will be described.

Figure 10:
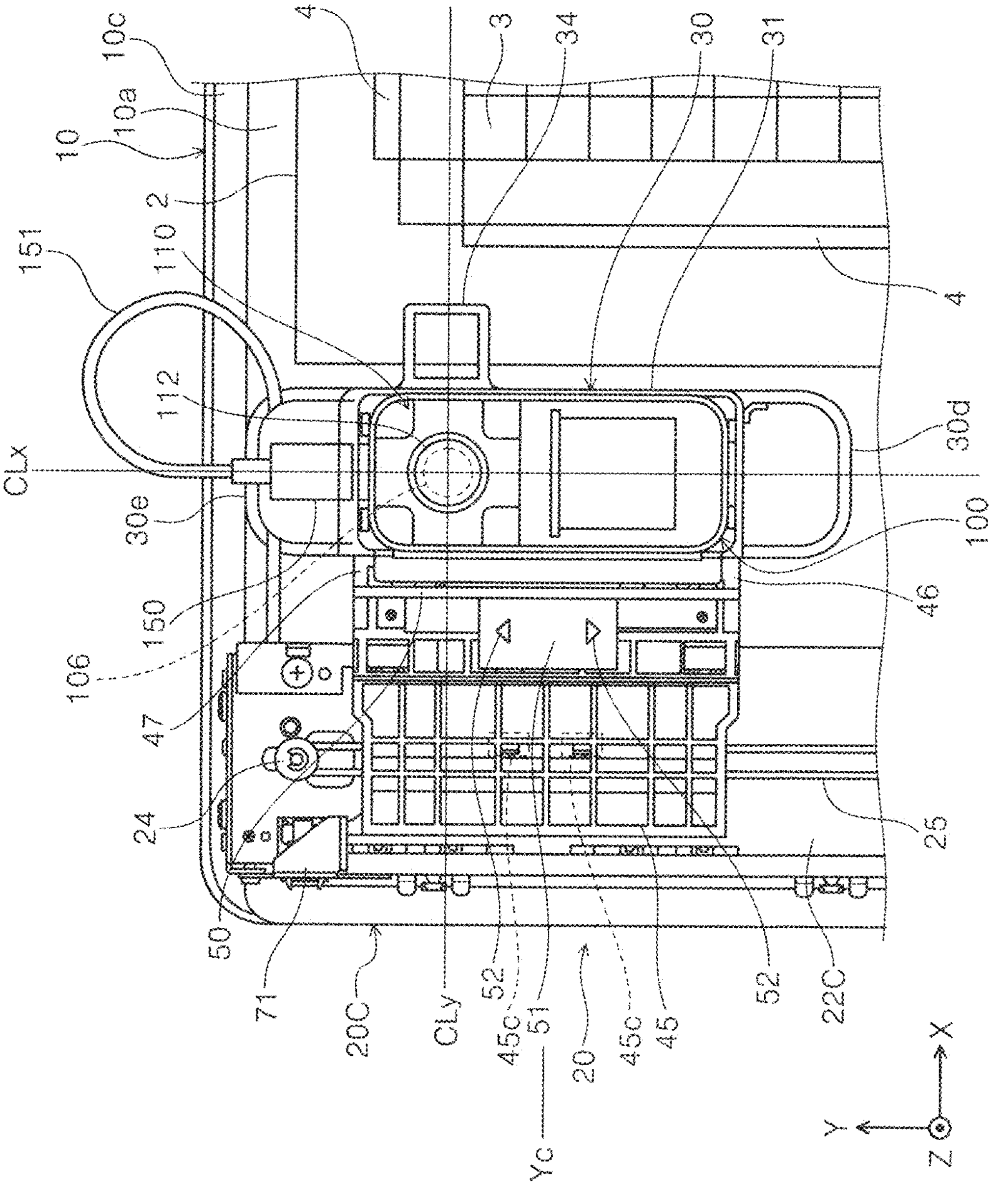
FIG. 10 is a plan view showing the internal structure of the carriage unit on which the colorimeter is mounted and the gantry as viewed from above.

As shown in FIGS. 8 and 10, an attachment section 50 is attached to the carriage slider 45. As shown in FIG. 2, FIG. 4 to FIG. 6, and FIG. 8, a first operation section 51 is attached to the attachment section 50. In this manner, the first operation section 51 is provided on the carriage slider 45 via the attachment section 50.

In particular, as shown in FIG. 8, the +Y direction side surface of the first operation section 51 is formed as a pinching section 51*b*, and also the −Y direction side surface is formed as a pinching section 51*c*. The pinching sections 51*b* and 51*c* are formed so as to be parallel to the X-Z plane, that is, so as to be orthogonal to the Y-axis direction. The first operation section 51 can be pinched in the Y-axis direction by the pinching sections 51*b* and 51*c*.

Note that in the present embodiment, the length of the first operation section 51 in the Y-axis direction is shorter than the lengths of the colorimeter 100 and the accommodation section 31, and is sized to be easily picked by the finger of the user.

The first operation section 51 is a portion to which an external force is applied by the user when the carriage unit 30 is manually moved in the Y-axis direction. The application direction of the external force in the present embodiment is the +Y direction or −Y direction. In this way, since the carriage unit 30 includes the first operation section 51, which is a portion to which an external force is applied by the user when the carriage unit 30 is manually moved in the Y-axis direction, it is possible to prevent the colorimeter 100 from being directly gripped when the user tries to manually move the carriage unit 30 in the movement direction. As a result, damage to the colorimeter 100, the carriage unit 30, and the like can be suppressed.

The carriage unit 30 is provided to be movable in the Y-axis direction by the power of the carriage motor 82, and the carriage unit 30 further includes the carriage slider 45, which is guided in the Y-axis direction by the beam section frame 22C, which extends in the Y-axis direction. The first operation section 51 is provided on the carriage slider 45.

Since the carriage unit 30 is guided in the Y-axis direction by the beam section frame 22C, the carriage unit 30 receives a reaction force from the beam section frame 22C when the carriage unit 30 moves in the Y-axis direction. Therefore, when the portion where the carriage unit 30 receives the reaction force from the beam section frame 22C, that is, the carriage slider 45, and the position of the first operation section 51 are separated from each other, the external force applied to the first operation section 51 is likely to act along the Y-axis direction, and a large external force is required when the carriage unit 30 is manually moved in the movement direction.

However, in the present embodiment, since the first operation section 51 is provided on the carriage slider 45, which is a portion that receives the reaction force from the beam section frame 22C, the portion in which the carriage unit 30 receives the reaction force from the beam section frame 22C and the position of the first operation section 51 are close to each other. As a result, the external force applied to the first operation section 51 can easily act along the Y-axis direction, and the carriage unit 30 can be manually moved with a light operation force.

Since the first operation section 51 is provided on the carriage slider 45, even when the accommodation section 31 moves up and down, the first operation section 51 does not follow the movement. Therefore, since the first operation section 51 does not separate from the carriage slider 45 in the Z-axis direction either, the external force applied to the first operation section 51 tends to act along the Y-axis direction and the carriage unit 30 can be manually moved with a light operation force, for example, even when the accommodation section 31 is in the mounting position (FIG. 19).

In the present embodiment, as shown in FIG. 10, the first operation section 51 and the belt gripping sections 45*c* and 45*c*, which are portions in which the carriage slider 45 is fixed to the first endless belt 25, are in a positional relationship of overlapping each other in the Y-axis direction. In other words, at least a portion of the first operation section 51 and at least a portion of the belt gripping section 45*c* are at the same position in the Y-axis direction. In other words, at least a part of the belt gripping section 45*c* is positioned in the −X direction with respect to at least a part of the first operation section 51. Note that in the present embodiment, the belt gripping sections 45*c* and 45*c* are positioned within the range of the first operation section 51 in the Y-axis direction. That is, the whole of the belt gripping section 45*c* is at the same position as a part of the first operation section 51 in the Y-axis direction. However, a part of the belt gripping section 45*c* may be at the same position as a part of the first operation section 51 in the Y-axis direction.

In the present embodiment, two belt gripping sections 45*c* are provided along the Y-axis direction, but one belt gripping section 45*c* or three or more belt gripping sections 45*c* may be provided in the Y-axis direction. Since the carriage slider 45 is configured to be pulled in the Y-axis direction by the first endless belt 25, the carriage slider 45 receives a reaction force from the first endless belt 25 when the carriage slider 45 is manually moved in the Y-axis direction. Therefore, when the position where the carriage slider 45 receives the reaction force from the first endless belt 25, that is, the belt gripping section 45*c*, is separated from the position of the first operation section 51, the external force applied to the first operation section 51 is less likely to act along the Y-axis direction and a large external force is required to manually move the carriage unit 30 in the Y-axis direction.

However, as described above, since the first operation section 51 and the belt gripping section 45*c*, which is a portion where the carriage slider 45 is fixed to the first endless belt 25, overlap each other in the Y-axis direction, the belt gripping section 45*c* and the first operation section 51 are close to each other. Accordingly, the external force applied to the first operation section 51 easily acts along the Y-axis direction, and the carriage unit 30 can be manually moved with a light operation force.

Note that in a case where a plurality of belt gripping sections 45*c* are provided along the Y-axis direction, it is sufficient that the center position of the reaction force that the carriage slider 45 receives from the first endless belt 25 by the plurality of belt gripping sections 45*c* and the first operation section 51 overlap in the Y-axis direction. In the present embodiment, when the center position of the reaction force that the carriage slider 45 receives from the first endless belt 25 by the plurality of belt gripping sections 45*c* is defined as a first reaction force acting position, the first reaction force acting position in the present embodiment is a position Yc in FIG. 10.

The carriage slider 45 receives the reaction force from the beam section frame 22C as described above and, in the present embodiment, when the center position of the reaction force received by the carriage slider 45 from the beam section frame 22C in the Y-axis direction is defined as a second reaction force acting position, it is desirable that the second reaction force acting position and the first reaction force acting position overlap the first operation section 51 in the Y-axis direction.

In the present embodiment, the second reaction force acting position is the same position Yc of FIG. 10 as the first reaction force acting position. In the present embodiment, the center position of the first operation section 51 in the Y-axis direction is also the position Yc in FIG. 10. That is, in the present embodiment, the first reaction force acting position, the second reaction force acting position, and the center position of the first operation section 51 coincide with each other. With this configuration, the carriage unit 30 can be manually moved by a lighter operation force.

However, the first reaction force acting position, the second reaction force acting position, the center position of the first operation section 51, these do not necessarily need to coincide in the Y-axis direction. However, it is more desirable that the first reaction force acting position and the second reaction force acting position are included in the region of the first operation section 51 in the Y-axis direction.

Next, in the present embodiment, a first identification mark 52 indicating the moving direction of the carriage unit 30 is provided on the first operation section 51. As a result, the moving direction of the carriage unit 30, that is, the operating direction of the first operation section 51 is visually easily recognized, and usability is improved. Note that in the present embodiment, the first identification mark 52 is a triangle, but it is needless to say that the first identification mark 52 is not limited to this, and may be another indication such as an arrow.

As shown in FIG. 19, when the accommodation section 31 is at the mounting position, the upper end portion of the first operation section 51 is at a position lower than the upper end portion of the accommodation section 31. In FIG. 19, reference numeral H1 denotes a position of the upper end portion of the accommodation section 31 at the mounting position. As shown, the upper end portion of the first operation section 51 is at a position lower than the position H1 of the upper end portion of the accommodation section 31 at the mounting position. As a result, the first operation section 51 is less likely to be an obstacle when the colorimeter 100 is attached to and detached from the accommodation section 31, and the attachment and detachment work of the colorimeter 100 can be performed more easily.

Note that incidentally, the upper end portion of the first operation section 51 can be visually recognized in plan view regardless of the position of the accommodation section 31 in the Z-axis direction.

Figure 9:
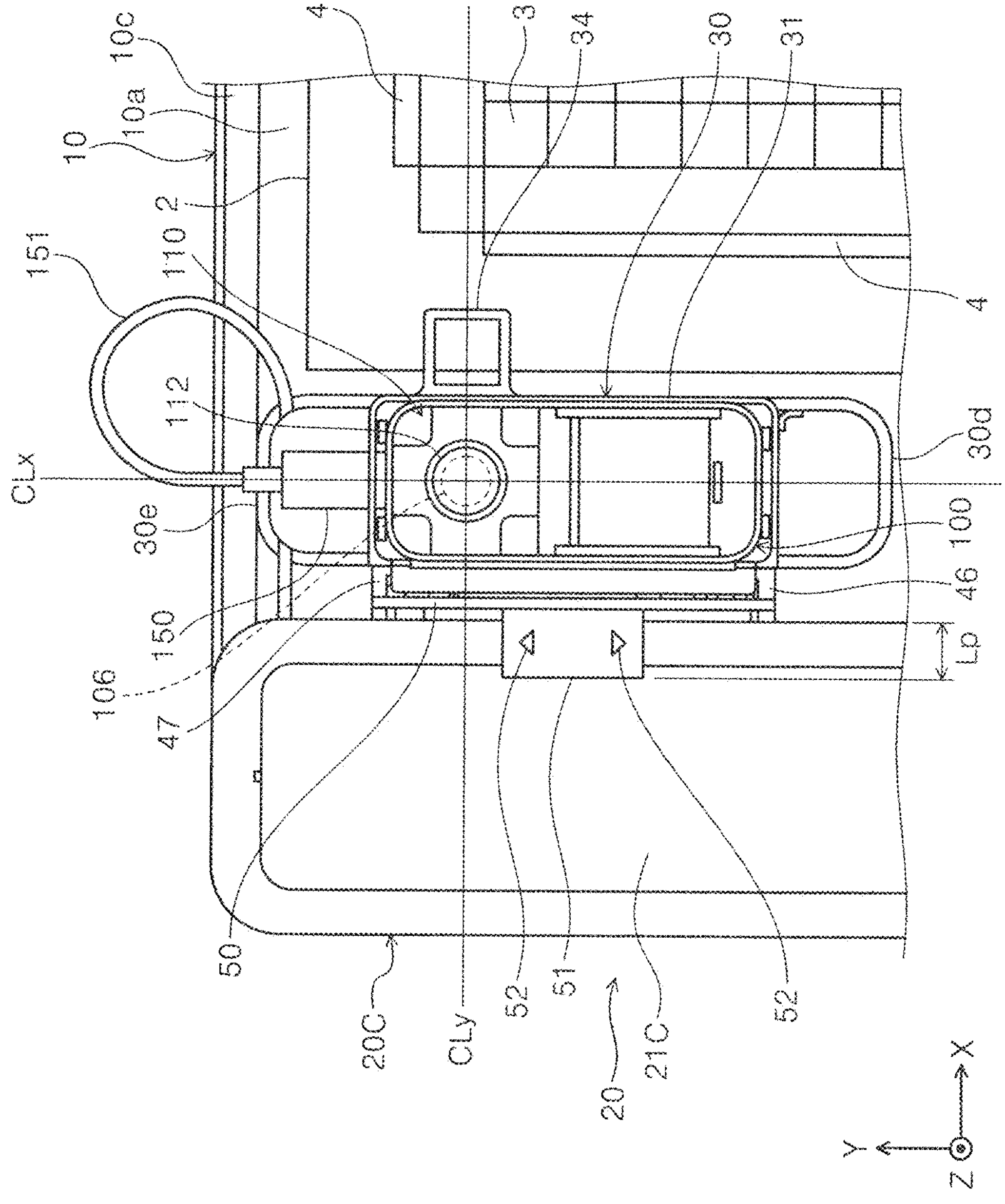
FIG. 9 is a plan view of the carriage unit and the gantry on which the colorimeter is mounted, as viewed from above.

As shown in FIG. 9, the gantry 20 includes the beam section cover 21C, which covers the beam section frame 22C and the carriage slider 45, and at least a portion of the first operation section 51 overlaps the beam section cover 21C in plan view of the first operation section 51. A region indicated by reference symbol Lp in FIG. 9 is a range in which the first operation section 51 and the beam section cover 21C overlap each other in the X-axis direction.

Then, in the present embodiment, the brightness of the color of the portion where the first operation section 51 overlaps with the beam section cover 21C is different from the brightness of the beam section cover 21C. As a result, the presence of the first operation section 51 is easily visually recognized, and usability is improved.

Figure 15:
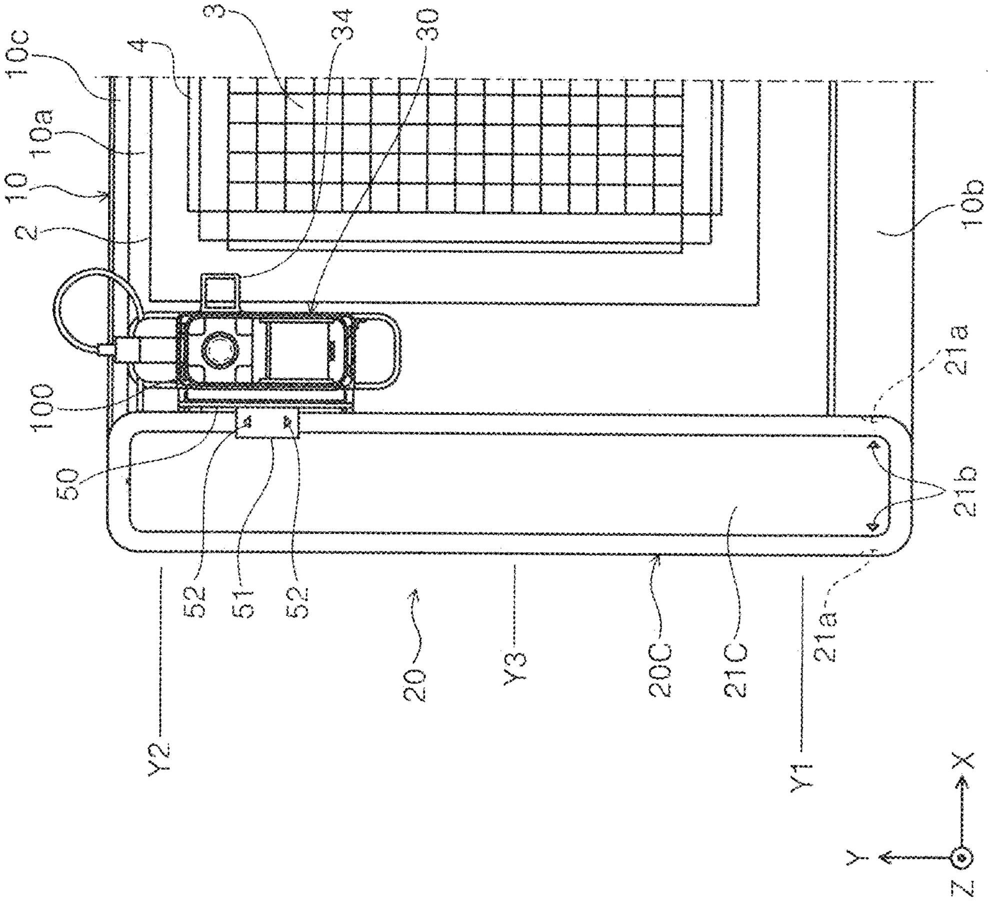
FIG. 15 is a plan view of a part of the colorimetry device as viewed from above.
Figure 16:
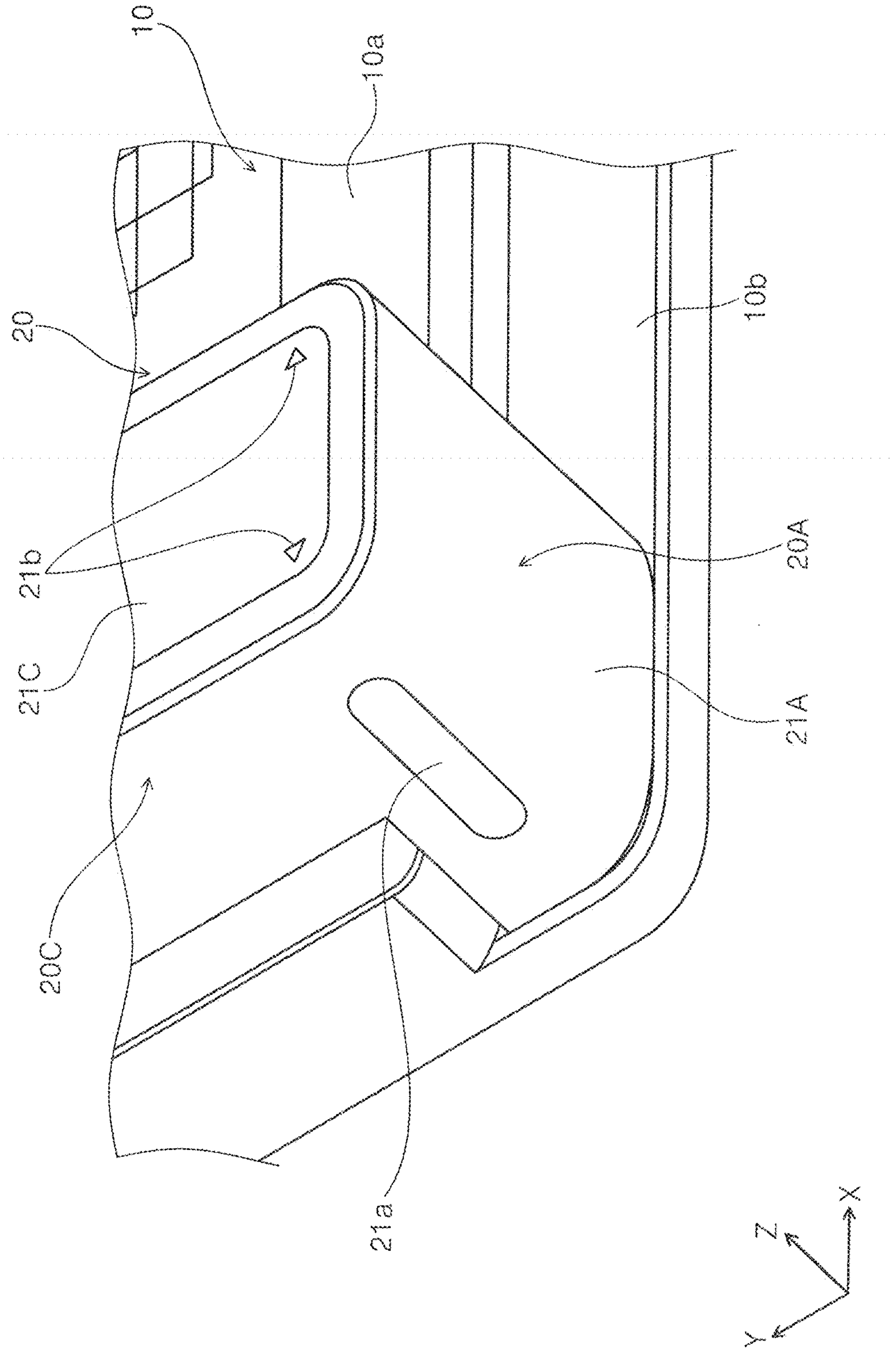
FIG. 16 is a perspective view of a part of the gantry.

Next, as shown in FIG. 3, FIG. 15, and FIG. 16, the gantry 20 is provided with a second operation section 21*a*, which is a portion to which an external force is applied when the gantry 20 is to be manually moved in the X-axis direction. In the present embodiment, the second operation section 21*a* is configured by recess sections provided on the side surface in the +X direction and the side surface in the −X direction of the first support section 20A. This can prevent the colorimeter 100 from being directly gripped when the user tries to manually move the gantry 20 in the X-axis direction. As a result, damage to the colorimeter 100, the carriage unit 30, and the like can be suppressed.

In the present embodiment, the first support section 20A of the gantry 20 is disposed closer to the device front side where the power button 5 is disposed than the second support section 20B, and the second operation section 21*a* is provided on the first support section 20A. Accordingly, the second operation section 21*a* is disposed at a position close to the user, and the operability when the user manually moves the gantry 20 in the X-axis direction is improved.

The first support section 20A includes a front slider 19A guided in the X-axis direction by a front guide 13, which extends in the X-axis direction. As shown in FIG. 3, the second operation section 21*a* includes an intermediate position Z3, which is between the front slider 19A and the position of the first support section 20A that is farthest away from the front guide 13 in the Z-axis direction, that is, the upper surface of the first support section 20A. The reference symbol Z2 is a position of the upper surface of the first support section 20A, and the symbol Z1 is a position of an upper surface of the front slider 19A. Reference symbol H2 denotes a formation region of the second operation section 21*a*.

As a result, the following effects can be obtained. That is, since the first support section 20A is guided in the X-axis direction by the front guide 13, the first support section 20A receives a reaction force from the front guide 13 when the first support section 20A is moved in the X-axis direction. Therefore, when the portion where the first support section 20A receives the reaction force from the front guide 13, that is, the position of the front slider 19A, and the position of the second operation section 21*a* are separated from each other, the external force applied to the second operation section 21*a* is less likely to act along the X-axis direction, and a large external force is required to manually move the first support section 20A in the X-axis direction.

However, as described above, since the second operation section 21*a* includes, in the Z-axis direction, the intermediate position 23 between the position Z2 of the first support section 20A farthest from the front guide 13 and the position Z1 of the upper surface of the front slider 19A, the portion where the first support section 20A receives the reaction force from the front guide 13 and the position of the second operation section 21*a* are close to each other. By this, the external force applied to the second operation section 21*a* easily acts along the X-axis direction, and the first support section 20A, that is, an X-axis direction moving section, can be manually moved with a light operation force.

In the present embodiment, since the second operation section 21*a* is constituted by the recess section provided on a side surface of the first support section 20A, it is possible to configure the second operation section 21*a* with a simple structure at a low cost. However, the second operation section 21*a* is not limited to a recess section, and may be configured by an outwardly protruding section, is also not limited to the side surface of the first support section 20A, and may be provided at a position on the upper surface of the gantry 20 that does not interfere with the carriage unit 30.

For example, in FIG. 15, the position Y1 is the center of the position where the front slider 19A receives reaction force in the Y-axis direction from the front guide 13, and this position is hereinafter referred to as a third reaction force acting position Y1. The position Y2 is the center of the position where the rear slider 19B receives a reaction force in the Y-axis direction from the rear guide 14, and this position is hereinafter referred to as a fourth reaction force acting position Y2. The position Y3 is an intermediate position between the third reaction force acting position Y1 and the fourth reaction force acting position Y2.

When the gantry 20 is to be manually moved along the X-axis direction, since the gantry 20 receives the reaction force at the third reaction force acting position Y1 and the fourth reaction force acting position Y2, it is desirable that the second operation section 21*a* be provided so as to include the intermediate position Y3.

However, it is desirable to determine the position of the second operation section 21*a* taking into consideration the balance with the operability by disposing the second operation section 21*a* at a position (first support section 20A) close to the user.

In the present embodiment, as shown in FIG. 2, FIG. 15, and FIG. 16, second identification marks 21*b* indicating the moving direction of the gantry 20 is provided on the upper surface of the first support section 20A. As a result, the moving direction of the gantry 20, that is, the operating direction of the second operation section 21*a* is easily visually recognized, and usability is improved.

In particular, in a case where the second operation section 21*a* is configured by the recess section provided on the side surface of the first support section 20A, it becomes difficult to visually recognize the second operation section 21*a* in plan view of the first support section 20A. However, since the second identification mark 21*b* is provided on the upper surface of the first support section 20A, it is possible to easily visually recognize that the second operation section 21*a* is provided.

Note that in the present embodiment, the second identification mark 21*b* is a triangle, but it is needless to say that the second identification mark 21*b* is not limited to this, and may be another indication such as an arrow.

Next, other features of the colorimetry device 1 according to the present embodiment will be described below.

The accommodation section 31 for mounting the colorimeter 100 is integrally provided on the side surface in the +X direction with an alignment frame 34 as shown in FIG. 2 to FIG. 5, FIG. 9, FIG. 10, FIG. 14 and FIG. 15.

Figure 23:
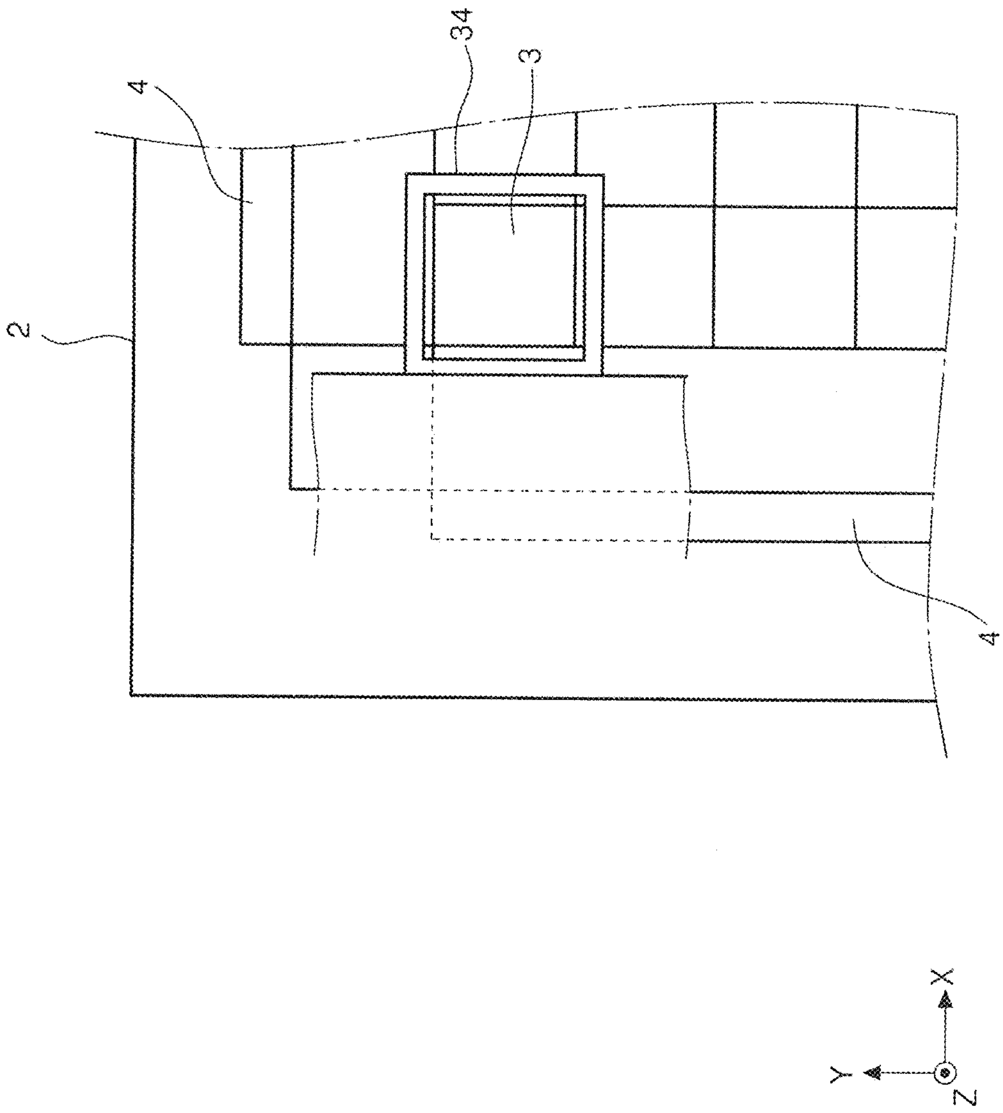
FIG. 23 is a plan view of an alignment frame and a color patch.

In the present embodiment, the alignment frame 34 has a substantially square opening in plan view and is configured so that the color patch 3 can be visually checked inside the alignment frame 34 in plan view, as shown in FIG. 23. In the present embodiment, since the alignment frame 34 is provided at a position close to the bottom portion of the accommodation section 31, the color patch 3 can be easily visually checked inside the alignment frame 34. The alignment frame 34 facilitates alignment of the carriage unit 30 with respect to the color chart 2.

When the user manually aligns the alignment frame 34 with the color patch 3, the control section 80 of the colorimetry device 1 can execute various controls such as grasping the current position of the colorimeter 100 with respect to the color chart 2.

As shown in FIG. 10 and FIG. 14, the alignment frame 34 is provided such that the center thereof corresponds to the optical axis of the colorimeter 100, that is, the center of the incident light processing section 107 (see FIG. 1). In FIG. 10 and FIG. 14, a straight line CLx is a straight line that is parallel to the Y-axis direction and that passes through the optical axis of the colorimeter 100 and a straight line CLy is a straight line that is parallel to the X-axis direction and that passes through the optical axis of the colorimeter 100. That is, the position where the straight line CLx and the straight line CLy intersect is the position of the optical axis of the colorimeter 100.

The alignment frame 34 is provided on the accommodation section 31 so that the center thereof is positioned on the straight line CLy. As a result, when the user manually aligns the alignment frame 34 with the color patch 3, the misalignment between the optical axis of the colorimeter 100 and the position of the color patch 3 can be suppressed.

In the present embodiment, the color patch 3 has a rectangular shape, and the opening of the alignment frame 34 also has a rectangular shape corresponding to the shape of the color patch 3. In addition, as shown in FIG. 23, the size of the opening of the alignment frame 34 in plan view is set to be slightly larger than the size of the color patch 3. Note that FIG. 23 shows the size relationship between the alignment frame 34 and the color patch 3 when the accommodation section 31 is at the height shown in FIG. 20.

By this, the four sides of the color patch 3 can be easily aligned with the four sides of the opening of the alignment frame 34, and the alignment accuracy is improved.

Note that even when the size of the opening of the alignment frame 34 and the size of the color patch 3 coincide with each other or the size of the opening of the alignment frame 34 is smaller than the size of the color patch 3, the four sides of the color patch 3 can be visually checked inside the opening of the alignment frame 34 by the alignment frame 34 leaving a gap in the Z-axis direction with respect to the color patch 3.

Note that as shown in FIG. 9, the straight line CLx and the straight line CLy pass through the center of the determination button 112, which has a perfect circular shape in plan view. Since the position at which the straight line CLx and the straight line CLy intersect is the position of the optical axis of the colorimeter 100, the center of the determination button 112 coincides with the optical axis. Further, since the center of the alignment frame 34 is positioned on the straight line CLy, the user can easily intuitively grasp the relative positional relationship between the position of the optical axis of the colorimeter 100 and the color patch 3.

Next, modification examples of the colorimetry device 1 according to the present embodiment will be described below.

(1) The first operation section 51, the pinching sections 51*b* and 51*c* (see FIG. 8) are parallel to the X-Z plane. However, the pinching sections 51*b* and 51*c* may be inclined with respect to the X-Z plane so as to be easily pinched by the user positioned at the center of the colorimetry device 1 in the X-axis direction, that is, in the device width direction.

The surfaces of the pinching sections 51*b* and 51*c* are not limited to flat surfaces and may be recess surfaces or convex surfaces.

(2) In the carriage unit 30 including the carriage slider 45 and the accommodation section 31, the first operation section 51 is provided on the carriage slider 45, and thus, when an external force in the X-axis direction is applied to the first operation section 51, rotation on the X-Y plane is unlikely to occur, and favorable operability is obtained. However, the first operation section 51 may be provided on the accommodation section 31. At that time, the first operation section 51 may be provided on the +X direction side surface of the accommodation section 31. This makes it easier to align the alignment frame 34, which is provided on the +X direction side surface of the accommodation section 31, with the color patch 3.

(3) Since the attachment section 50 for attaching the first operation section 51 forms a shape that rises up in the +Z direction from the carriage slider 45 as shown in FIG. 8, the first operation section 51 of FIG. 8 may be omitted and the attachment section 50 may serve as a first operation section. In this case, anti-slip portions may be provided on the side surface in the +Y direction and the side surface in the −Y direction of the attachment section 50. This makes it difficult for the fingers to slip when the attachment section 50 is gripped.

Note that the portion of the attachment section 50 that rises in the Z-axis direction is positioned between the beam section 20C of the gantry 20 and the accommodation section 31 of the carriage unit 30 in plan view as shown in FIG. 9 in the present embodiment, but the portion rising in the Z-axis direction may be in a position overlapping with the beam section 20C of the gantry 20.

(4) In FIG. 9, the first operation section 51 is positioned in the −Y direction with respect to the straight line CLy, but the first operation section 51 may be provided so that the straight line CLy passes through the first operation section 51. As a result, the positions of the optical axis of the colorimeter 100, the alignment frame 34, and the first operation section 51 in the Y-axis direction coincide with each other, and it is easy for the user to intuitively grasp the respective positional relationship.

Figure 24:
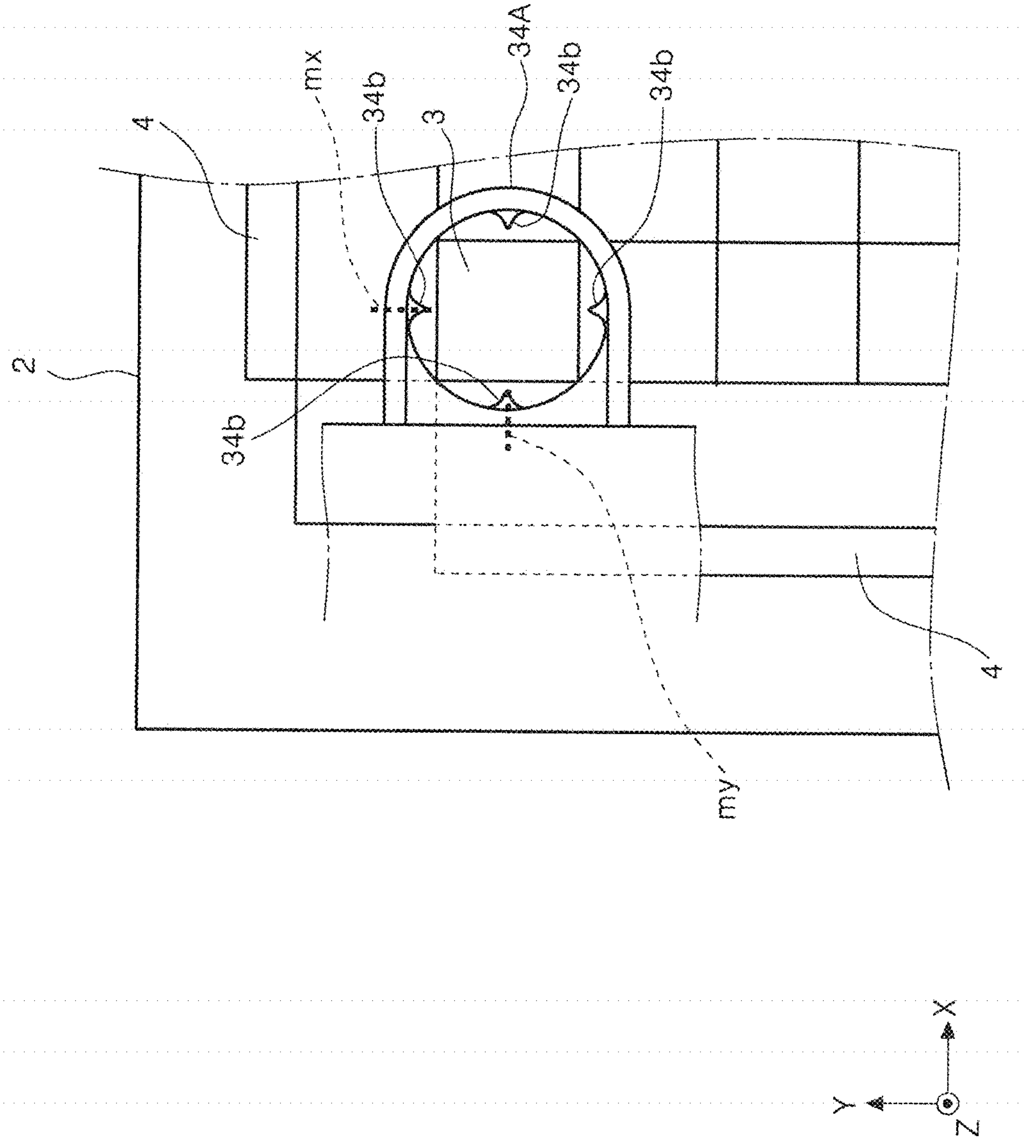
FIG. 24 is a plan view of an alignment frame and the color patch according to another embodiment.

(5) The outer shape of the alignment frame may be circular as in the alignment frame 34A shown in FIG. 24. The opening of the alignment frame may also be circular like the alignment frame 34A shown in FIG. 24.

Protrusions 34*b* toward the center of the opening may be provided inside the opening of the alignment frame 34A. By providing the projections 34*b*, the alignment frame 34A can be easily aligned with respect to the color patch 3. In particular, when a mark mx indicating the X-axis direction center position and a mark my indicating the Y-axis direction center position of the color patch 3 are provided on the color patch 3 positioned at the four corners of the color chart 2, the alignment frame 34A can be easily aligned with the color patch 3 by aligning the protrusions 34*b* with the marks mx and my.

Figure 25:
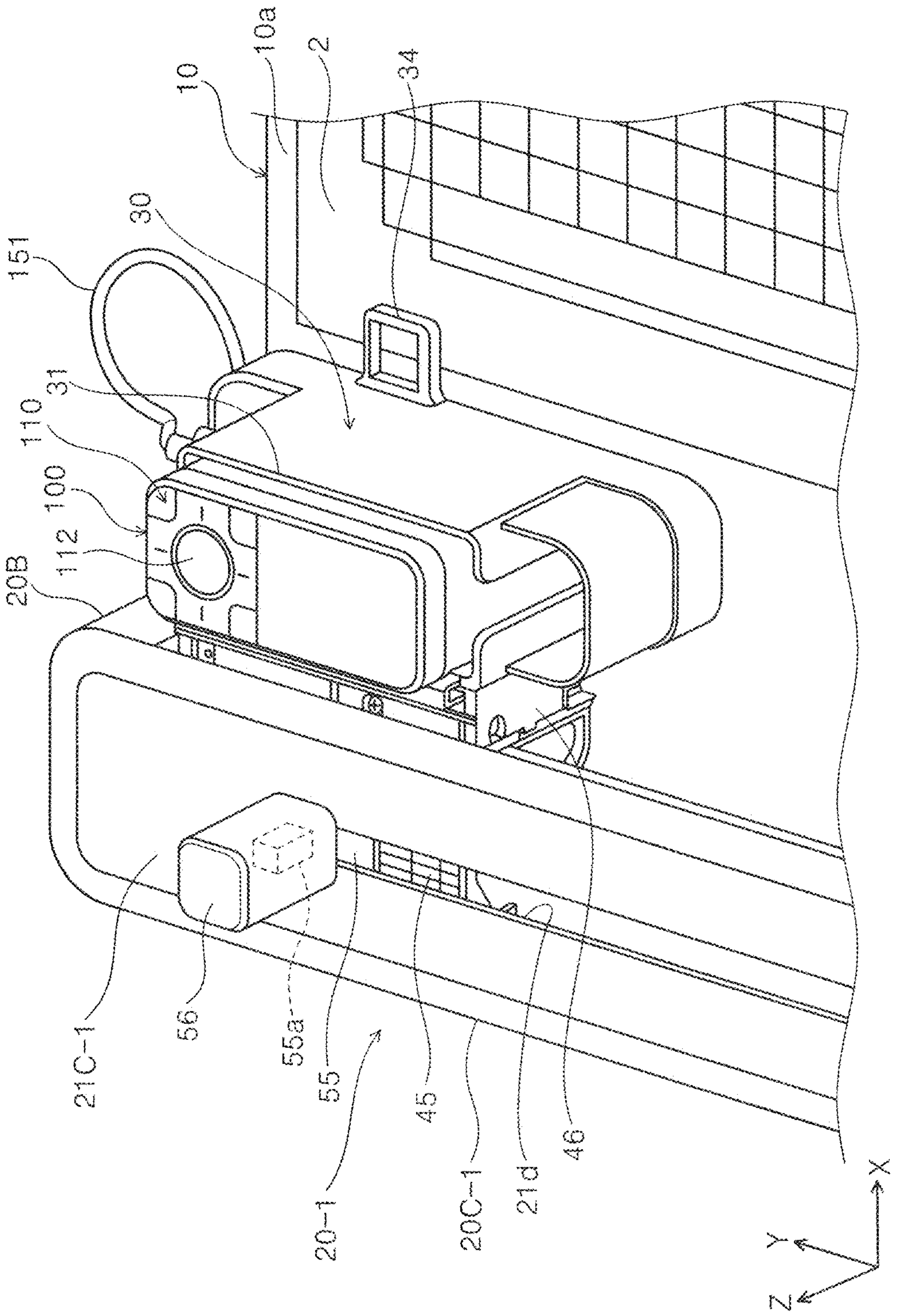
FIG. 25 is a perspective view showing another embodiment of a first operation section.

(6) The first operation section 51 can be modified like a first operation section 56 shown in FIG. 25. The first operation section 56 shown in FIG. 25 has a shape that rises in the +Z direction from the beam section 20C-1 of the gantry 20-1.

An attachment member 55 is attached to the carriage slider 45, and a protrusion 55*a* rising in the +Z direction is formed on the attachment member 55. An elongated hole 21*d* is formed along the Y-axis direction in a beam section cover 21C-1 constituting the upper surface of the beam section 20C-1, and the protrusion 55*a* protrudes in the +Z direction from the beam section cover 21C-1 through the elongated hole 21*d*. The first operation section 56 is attached to the protrusion 55*a*.

According to such a first operation section 56, it is possible to manually move the carriage unit 30 in both directions of the Y-axis direction and the X-axis direction. As a result, the second operation section 21*a* described above can be omitted, and the cost of the device can be reduced.

According to the first operation section 56, the gripping property when the user grips is also improved. Note that the first operation section 56 may be a cylindrical shape and not only a prismatic shape. The first operation section 56 may be configured to fall at a predetermined angle in a direction in which an external force is applied when the external force is applied, thereby improving operability. The first operation section 56 may be configured to be detachably and attachably accommodated with respect to the protrusion 55*a*. By the first operation section 56 being formed in a color different from that of the beam section cover 21C-1 or the carriage unit 30, visibility of the first operation section 56 is improved.

Figure 26:
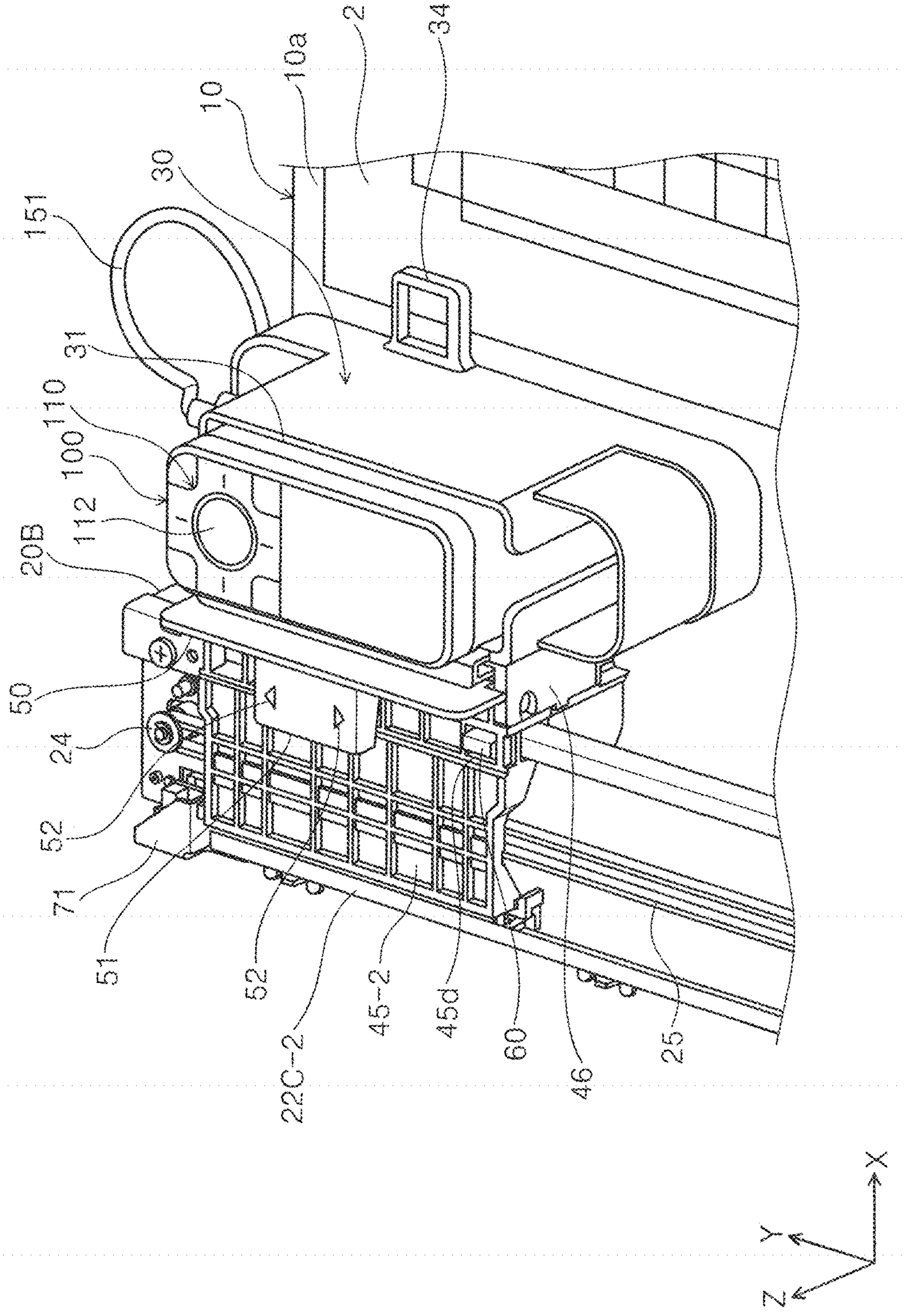
FIG. 26 is a perspective view of a gantry internal structure including a locking member for locking the carriage unit at a home position.

(7) As shown in FIG. 26, a lock member 60 for locking the carriage unit 30 in the home position may be provided.

The lock member 60 is provided so as to be switchable between a fitted state in which the lock member 60 is fitted, from the lower side of the beam section frame 22C-2, into an opening section (not shown) formed in the beam section frame 22C-2 and into an opening section 45*d* formed in the carriage slider 45-2, and a retreated state in which the lock member 60 is retreated from at least the opening section 45*d* formed in the carriage slider 45-2. The state switch of the lock member 60 is performed by power of a power source (not shown).

When the device is not in operation or when the power is off, the control section 80 of the colorimetry device 1 moves the carriage unit 30 to the home position in FIG. 26 and also moves the gantry 20 to the home position in FIG. 26. At this time, by locking the carriage unit 30 at the home position by the lock member 60, it is possible to prevent the carriage unit 30 from unintentionally moving in the Y-axis direction and, for example, it is possible to suppress damage during transportation of the device. Of course the gantry 20 may be prevented from unintentionally moving in the X-axis direction by providing a locking mechanism for locking the gantry 20 in the home position. The state switch of the lock member 60 may use the power of the raising and lowering motor 83.

(8) A unit may be provided to reduce the operating force when applying an external force to the first operation section 51 to move the carriage unit 30 in the Y-axis direction.

Figure 27:
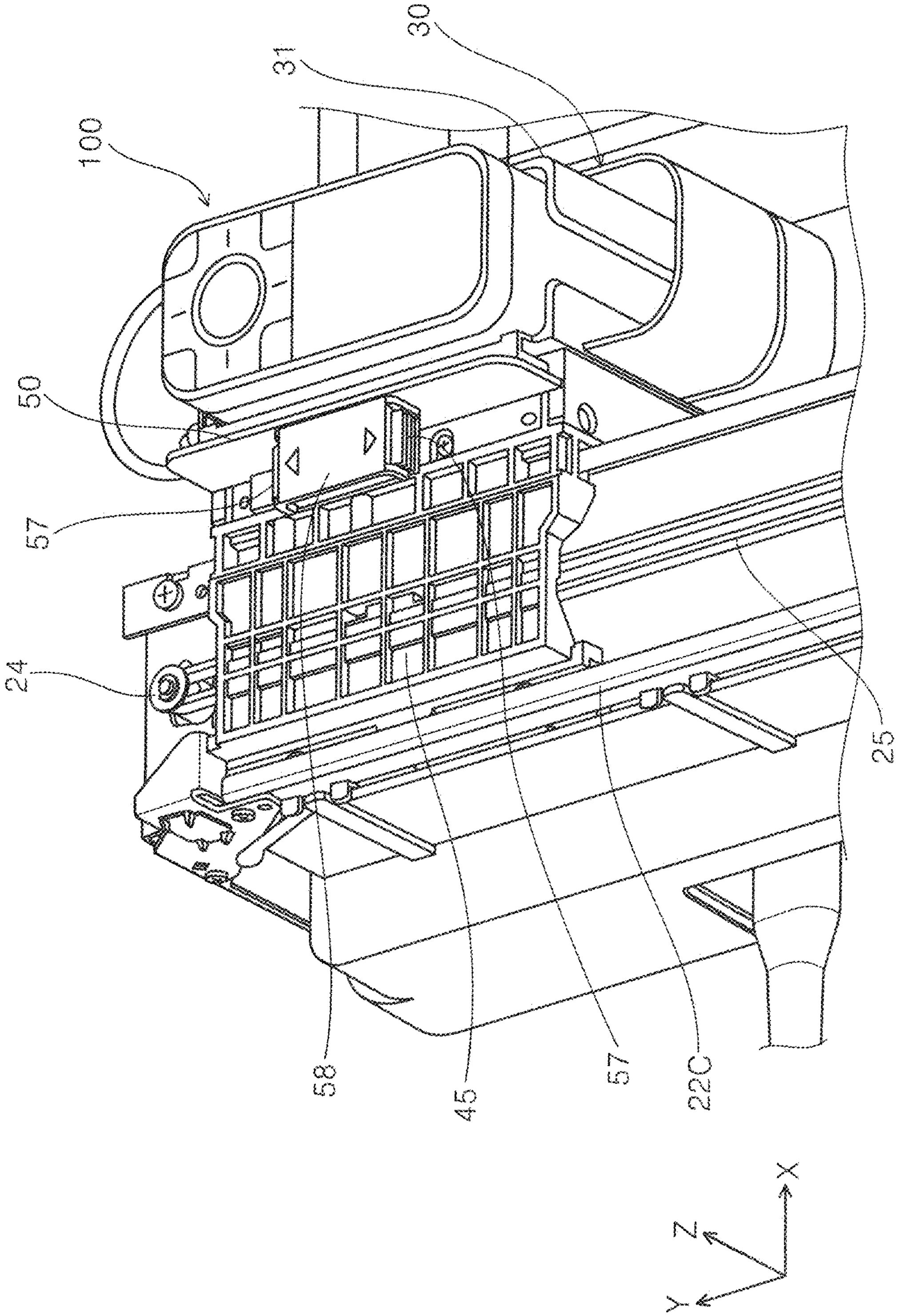
FIG. 27 is a perspective view of a configuration in which a pressing knob for reducing an operating force to the first operation section.
Figure 28A:
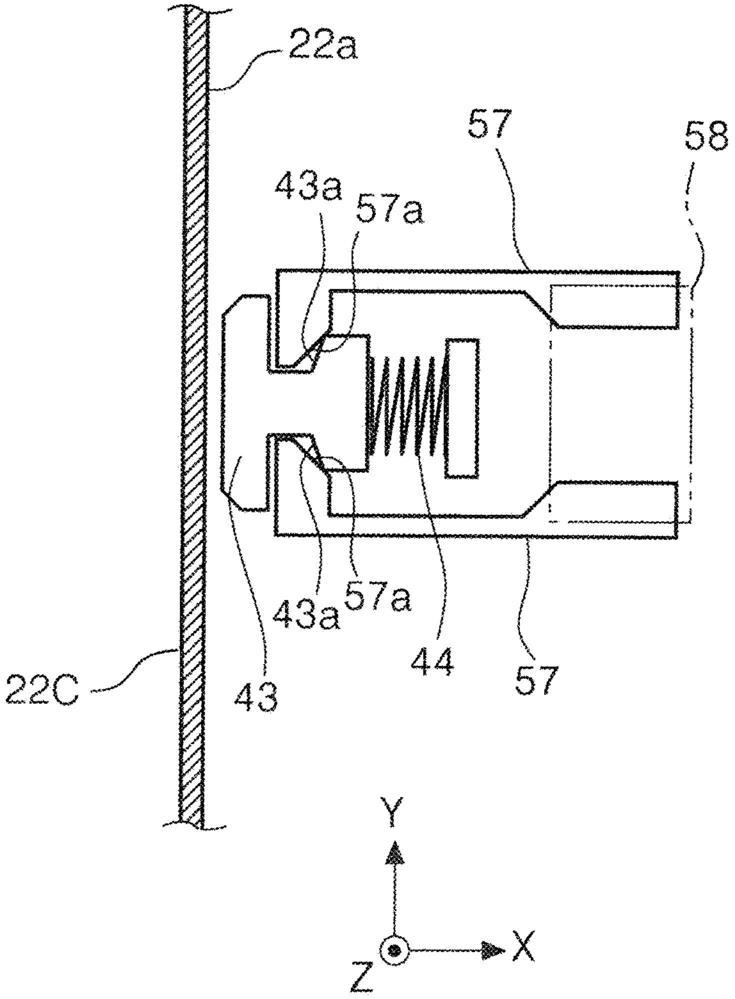
FIGS. 28A and 28B are a view showing a state transition of a structure for reducing the operation force by the pressing knob.
Figure 28B:
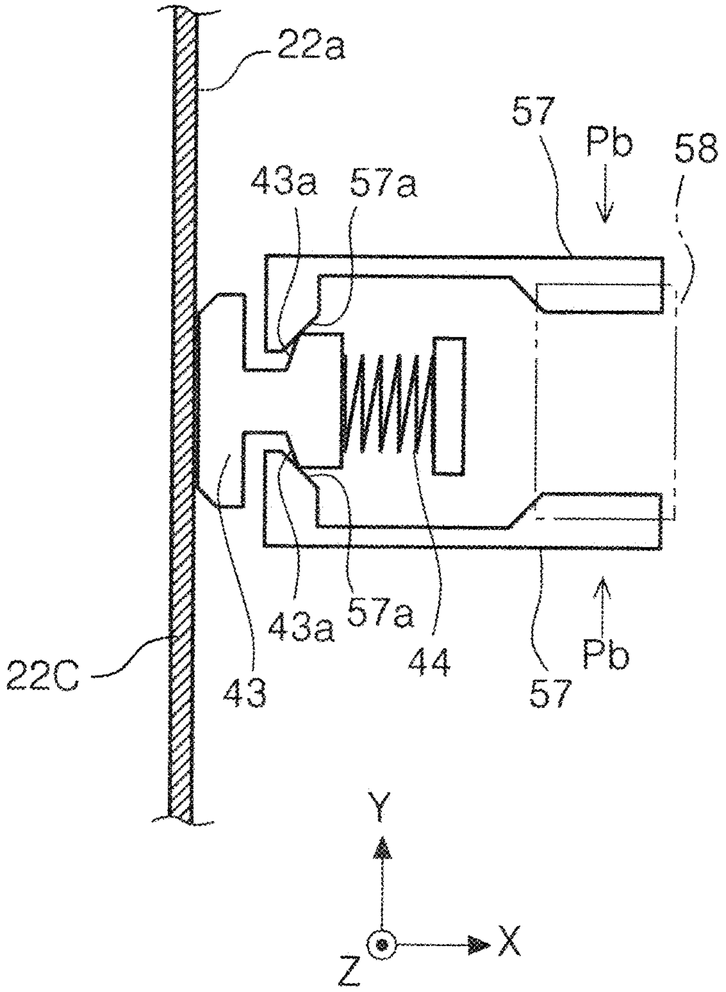

In FIG. 27, a first operation section 58 is provided with pressing knobs 57. The pressing knobs 57 are provided facing each other in the Y-axis direction as shown in FIGS. 28A and 28B, so that the pressing knob 57 provided in the +Y direction protrudes from the first operation section 58 in the +Y direction, and the pressing knob 57 provided in the −Y direction protrudes from the first operation section 58 in the −Y direction. The pressing knobs 57 are provided so as to be displaceable along the Y-axis direction by a guide section (not shown) provided on the carriage slider 45.

The pressing knob 57 is a portion where the end portion in the +X direction is pressed by the finger of the user, the cam section 57*a* is provided at the end portion in the −X direction.

A cam follower section 43*a* is formed in the pressing slider 43, which presses and contacts against the first guide surface 22*a* of the beam section frame 22C. When the pair of pressing knobs 57 are displaced so as to approach each other, then, as shown by the change from FIG. 28B to FIG. 28A, the cam section 57*a* moves the pressing slider 43 in the +X direction against the pressing force of the spring 44. As a result, the pressing slider 43 is released from the state of being pressed and contacted against the first guide surface 22*a* and is separated from the first guide surface 22*a*.

The pair of pressing knobs 57 are displaced so as to approach each other by the user squeezing them as indicated by arrows Pb in FIG. 28B.

As described above, the carriage unit 30 includes the pressing knobs 57, which is a unit for reducing the force of the pressing slider 43 pressing and contacting against the first guide surface 22*a*.

Here, the force that the pressing slider 43 presses and contacts against the first guide surface 22*a* becomes resistance when the carriage unit 30 is moved by applying an external force to the first operation section 58, which leads to a decrease in operability. However, as described above, since the carriage unit 30 is provided with the pressing knobs 57, which are for reducing the pressure with which the pressing slider 43 is pressed and contacted against the first guide surface 22*a*, the resistance at the time of moving the carriage unit 30 by applying an external force to the first operation section 58 is reduced, and the operability can be improved.

Note that in the present embodiment, the pressing slider 43 is configured to separate from the first guide surface 22*a* by the pressing knobs 57, but even if the state in which contact of the pressing slider 43 with the first guide surface 22*a* is maintained, it is sufficient if the force with which the pressing slider 43 presses and contacts against the first guide surface 22*a* is reduced.

(9) In the present embodiment, the first operation section 51, which is an operation section for when the carriage unit 30 is to be moved in the Y-axis direction, is provided, and the second operation section 21*a*, which is an operation section for when the carriage unit 30 is to be moved in the X-axis direction, is provided, but only one of the first operation section 51 and the second operation section 21*a* may be provided.

The present disclosure is not limited to the embodiments described above, and various modifications can be made within the scope of the disclosure described in the claims, and it is needless to say that these are also included in the scope of the present disclosure.

What is claimed is:

1. A colorimetry device comprising:
- a support base having a support surface for supporting a measurement target; and
- a carriage unit configured to move in, as a moving direction, at least one of a first direction, which is a direction along the support surface, and a second direction, which is a direction along the support surface and which intersects the first direction, wherein
- the carriage unit includes
  - a colorimeter holder that is open in a third direction perpendicular to the first direction and the second direction, such that the third direction is a vertical direction when the first direction and the second direction define a horizontal plane, the colorimeter holder being configured to slidably receive the colorimeter when inserted downwards in the third direction when the third direction is the vertical direction, and which is configured to slidably release the colorimeter when removed upwards in the third direction when the third direction is the vertical direction; and
  - a first manual slider, which is a portion to which an external force is applied by a user when the carriage unit is manually moved in the moving direction.

2. The colorimetry device according to claim 1, wherein
- with the first direction as the moving direction, the carriage unit is configured to move in the first direction by power of a first motor; and
- the carriage unit further includes a first guided section guided in the first direction by a first guide section, which extends in the first direction.

3. The colorimetry device according to claim 2, wherein
- the first manual slider is provided on the first guided section.

4. The colorimetry device according to claim 3, further comprising:
- a first endless belt that is a belt to which the first guided section is fixed and that is provided along the first direction,
- a first drive pulley around which the first endless belt is wound, and
- a first driven pulley that is a pulley provided at a position separated with respect to the first drive pulley in the first direction and that around which the first endless belt is wound, wherein
- the first manual slider and a portion where the first guided section is fixed to the first endless belt overlap each other in the first direction.

5. The colorimetry device according to claim 3, wherein the first guide section includes a first guide surface extending in the first direction,
the first guided section includes
a pressing slider that presses against and contacts the first guide surface and
a pressing member that presses the pressing slider toward the first guide surface, and
the carriage unit includes a unit for reducing the force with which the pressing slider presses against the first guide surface.

6. The colorimetry device according to claim 2, wherein the carriage unit is provided on a second direction moving section which is a portion that has a shape extending in the first direction and that is configured to move in the second direction with respect to the support base by the power of a second motor, and
the second direction moving section is provided with a second manual slider, which is a portion to which an external force is applied by a user when the second direction moving section is manually moved in the second direction.

7. The colorimetry device according to claim 6, wherein the first direction is along a device depth direction,
the second direction moving section includes
a first support section extending in the third direction,
a second support section that is disposed separated by a gap with respect to the first support section in the first direction and that extends in the third direction, and
a beam section that extends in the first direction and that is supported by the first support section and the second support section,
the first support section is disposed on a device front side on which a power button of the device is disposed with respect to the second support section, and
the second operation section is provided on the first support section.

8. The colorimetry device according to claim 7, wherein the first support section includes a second guided section that is guided in the second direction by a second guide section, which extends in the second direction and
the second manual slider includes an intermediate position between a position of the first support section farthest from the second guided section and the second guided section in the third direction.

9. The colorimetry device according to claim 7, wherein the second manual slider is constituted by a recess section provided on a side surface of the first support section.

10. The colorimetry device according to claim 9, wherein a second identification mark indicating the moving direction of the second direction moving section is provided on the upper surface of the first support section.

11. The colorimetry device according to claim 1, wherein the first manual slider is provided with a first identification mark indicating a moving direction of the carriage unit.

12. The colorimetry device according to claim 1, wherein the colorimeter holder is provided to be movable by the power of a raising and lowering motor in the third direction, the colorimeter holder being further configured to advance and retreat in the third direction with respect to the support surface,
when the colorimeter is to be mounted in the colorimeter holder, a control section for controlling the raising and lowering motor positions the colorimeter holder at a mounting position in the third direction, and
when the third direction is along a vertical direction and the colorimeter holder is at the mounting position, an upper end portion of the first manual slider is at a position lower than an upper end portion of the colorimeter holder.

13. The colorimetry device according to claim 1, wherein
the carriage unit includes an alignment frame disposed on a side surface of the colorimeter holder, and
the alignment frame has an opening for alignment with respect to the measurement target.

14. A colorimetry device comprising:
a support base having a support surface for supporting a measurement target; and
a carriage unit configured to move in, as a moving direction, at least one of a first direction, which is a direction along the support surface, and a second direction, which is a direction along the support surface and which intersects the first direction, wherein
the carriage unit includes
a colorimeter holder that is open in a third direction perpendicular to the first direction and the second direction, such that the third direction is a vertical direction when the first direction and the second direction define a horizontal plane, the colorimeter holder being configured to slidably receive the colorimeter when inserted downwards when the third direction is the vertical direction, and which is configured to slidably release the colorimeter when removed upwards in the third direction when the direction is the vertical direction; and
an alignment frame disposed on a side surface of the colorimeter holder, wherein the alignment frame has an opening for alignment with respect to the measurement target.

15. A colorimetry device comprising:
a support base having a support surface for supporting a measurement target; and
a carriage unit configured to move in, as a moving direction, at least one of a first direction, which is a direction along the support surface, and a second direction, which is a direction along
the support surface and which intersects the first direction, wherein the carriage unit includes a colorimeter holder that is open in a third direction perpendicular to the first direction and the second direction, such that the third direction is a vertical direction when the first direction and the second direction define a horizontal plane, the colorimeter holder being configured to slidably receive the colorimeter when inserted downwards in the third direction when the third direction is the vertical direction, and which is configured to slidably release the colorimeter when removed upwards in the third direction when the third direction is the vertical direction;
a first manual slider, which is a portion to which an external force is applied by a user when the carriage unit is manually moved in the moving direction, wherein with the first direction as the moving direction, the carriage unit is configured to move in the first direction by power of a first motor; and the carriage unit further includes a first guided section guided in the first direction by a first guide section, which extends in the first direction, wherein the first manual slide is provided on the first guided section; and a first cover member that covers the first guide section and the first guided section, wherein at least a portion of the first manual slider overlaps with the first cover member in plan view of the first manual slider and a brightness of a color of the portion where the first manual slider overlaps the first cover member in plan view of the first manual slider is different from a brightness of a color of the first cover member.

* * * * *